United States Patent
Leong

(10) Patent No.: US 10,259,653 B2
(45) Date of Patent: Apr. 16, 2019

(54) PLATFORMS FOR OMNIDIRECTIONAL MOVEMENT

(71) Applicant: Feedback, LLC, Menlo Park, CA (US)

(72) Inventor: Bradley Leong, San Francisco, CA (US)

(73) Assignee: Feedback, LLC, Menlo Park, CA (US)

( * ) Notice: Subject to any disclaimer, the term of this patent is extended or adjusted under 35 U.S.C. 154(b) by 0 days.

(21) Appl. No.: 15/841,557

(22) Filed: Dec. 14, 2017

(65) Prior Publication Data

US 2018/0170678 A1    Jun. 21, 2018

Related U.S. Application Data

(60) Provisional application No. 62/434,595, filed on Dec. 15, 2016.

(51) Int. Cl.
| | |
|---|---|
| *B65G 13/10* | (2006.01) |
| *B65G 17/24* | (2006.01) |
| *B65G 39/02* | (2006.01) |
| *G06F 3/01* | (2006.01) |
| *A63B 22/02* | (2006.01) |

(52) U.S. Cl.
CPC ............... *B65G 13/10* (2013.01); *A63B 22/02* (2013.01); *B65G 17/24* (2013.01); *B65G 39/02* (2013.01); *G06F 3/011* (2013.01); *A63B 2022/0271* (2013.01); *B65G 2207/34* (2013.01); *G06F 2203/012* (2013.01)

(58) Field of Classification Search
CPC .......................... B65G 2207/34; B65G 39/025
USPC .......... 198/370.09, 370.1, 371.2, 371.3, 415; 193/35 MD
See application file for complete search history.

(56) References Cited

U.S. PATENT DOCUMENTS

| | | | | |
|---|---|---|---|---|
| 1,342,220 | A | * | 6/1920 | Lewis .................... B21B 39/12 198/415 |
| 3,550,756 | A | | 12/1970 | Komylak |
| 3,874,491 | A | * | 4/1975 | Faure .................... B65G 13/10 193/35 MD |
| 4,676,361 | A | | 6/1987 | Heisler |
| 4,720,006 | A | | 1/1988 | Lenherr |
| 4,981,209 | A | | 1/1991 | Sogge |
| 5,069,440 | A | | 12/1991 | Lazzarotti et al. |
| 5,074,405 | A | | 12/1991 | Magolske et al. |
| 5,238,099 | A | | 8/1993 | Schroeder et al. |

(Continued)

*Primary Examiner* — James R Bidwell
(74) *Attorney, Agent, or Firm* — Lerner, David, Littenberg, Krumholz & Mentlik, LLP

(57) ABSTRACT

A platform for providing omnidirectional movement includes a first moveable member, a second moveable member, and a drive system. The first moveable member has an exterior surface adapted to support an object and has a plurality of first grooves therein. The second moveable member has an exterior surface adapted to support the object and has a plurality of second grooves therein. The drive system is operably coupled to the first and second moveable members and is adapted to independently drive the first and second moveable members in a forward direction and a reverse direction. The pluralities of first and second grooves are adapted to interact with the object to move the object in any direction along the exterior surfaces of the first and second moveable members when the drive system is driving at least one of the first and second moveable members.

21 Claims, 31 Drawing Sheets

(56) References Cited

U.S. PATENT DOCUMENTS

| | | | |
|---|---|---|---|
| 5,335,780 A * | 8/1994 | Watson | B65G 13/10 198/787 |
| 5,562,572 A | 10/1996 | Carmein | |
| 5,913,684 A | 6/1999 | Latham et al. | |
| 5,918,725 A * | 7/1999 | Farina | B65G 47/2445 198/415 |
| 6,123,647 A | 9/2000 | Mitchell | |
| 6,135,928 A | 10/2000 | Butterfield | |
| 6,152,854 A | 11/2000 | Carmein | |
| 6,360,865 B1 | 3/2002 | Leon | |
| 6,409,010 B1 | 6/2002 | Leon | |
| 6,591,966 B1 * | 7/2003 | Lee | G06K 7/10861 198/373 |
| 6,648,128 B2 * | 11/2003 | Yamashita | H01L 21/67706 193/35 MD |
| 6,743,154 B2 | 6/2004 | Epstein | |
| 6,981,580 B2 | 1/2006 | Meyer | |
| 7,101,318 B2 | 9/2006 | Holmes | |
| 7,150,704 B2 | 12/2006 | Schaeffer | |
| 7,191,894 B2 | 3/2007 | Costanzo et al. | |
| 7,399,258 B1 | 7/2008 | Sugar et al. | |
| 7,470,218 B2 | 12/2008 | Williams | |
| 7,682,291 B2 | 3/2010 | Gill et al. | |
| 7,780,573 B1 | 8/2010 | Carmein | |
| 7,878,284 B1 | 2/2011 | Shultz | |
| 7,900,768 B2 | 3/2011 | Fourney | |
| 8,276,701 B2 | 10/2012 | Shultz | |
| 8,567,587 B2 * | 10/2013 | Faist | B65G 1/0478 198/370.09 |
| 8,675,018 B2 | 3/2014 | Mishra et al. | |
| 8,790,222 B2 | 7/2014 | Burger | |
| 9,329,681 B2 | 5/2016 | Goetgeluk | |
| 2001/0003712 A1 | 6/2001 | Roelofs | |
| 2004/0106504 A1 | 6/2004 | Reiffel | |
| 2005/0023105 A1 * | 2/2005 | Costanzo | B65G 13/12 193/35 MD |
| 2005/0148432 A1 | 7/2005 | Carmein | |
| 2005/0150748 A1 * | 7/2005 | Zubair | B65G 17/08 198/853 |
| 2005/0233865 A1 | 10/2005 | Reiffel | |
| 2010/0022358 A1 | 1/2010 | Schwaiger et al. | |
| 2010/0170769 A1 | 7/2010 | Jung | |
| 2012/0071300 A1 | 3/2012 | Shapiro et al. | |
| 2013/0132910 A1 | 5/2013 | Belmon | |
| 2014/0179490 A1 | 6/2014 | Schmitz et al. | |
| 2014/0295140 A1 | 10/2014 | King et al. | |
| 2014/0336010 A1 | 11/2014 | Burger | |
| 2015/0190713 A1 | 7/2015 | Goetgeluk et al. | |
| 2016/0179190 A1 | 6/2016 | Lee et al. | |
| 2016/0216759 A1 | 7/2016 | Goetgeluk | |

* cited by examiner

| Direction of Belts 102 | Direction of Belts 104 | Speed of Belts 102 | Speed of Belts 104 | Direction of Movement of Object 150 |
|---|---|---|---|---|
|  |  |  |  |  |
| Forward | Forward | 1x | 1x | Forward |
| Reverse | Reverse | 1x | 1x | Reverse |
| Forward | Reverse | 1x | 1x | Right |
| Reverse | Forward | 1x | 1x | Left |

*FIG. 1H*

| Direction of Chain 202 | Direction of Chain 204 | Speed of Chain 202 | Speed of Chain 204 | Direction of Movement of Object 250 |
|---|---|---|---|---|
|  |  |  |  |  |
| Forward | Forward | 1x | 1x | Forward |
| Reverse | Reverse | 1x | 1x | Reverse |
| Forward | Reverse | 1x | 1x | Left |
| Reverse | Forward | 1x | 1x | Right |

*FIG. 2G*

PLATFORMS FOR OMNIDIRECTIONAL MOVEMENT

CROSS-REFERENCE TO RELATED APPLICATIONS

This application claims the benefit of the filing date of U.S. Provisional Patent Application No. 62/434,595, filed Dec. 15, 2016, the disclosure of which is hereby incorporated by reference herein.

BACKGROUND OF THE DISCLOSURE

Moving platforms have uses in a number of different areas. For example, moving platforms may provide movement of an object on the platform from a first point to a second point with little or no human interaction being necessary. This type of use may take the form, for example, of one or more conveyor belts moving boxes from an initial location to a final desired location. In other examples, moving platforms may provide a surface on which an individual may walk, run, or otherwise move with the individual maintaining a substantially constant real-world position. This type of use may take the form, for example, of a treadmill or similar device that allows a person to perform movements with respect to the platform without significant movement with respect to the room in which the platform is positioned.

Many moving platforms of the type described above are either unidirectional or bidirectional, capable of moving an object only in a single direction (e.g. forward) or two opposite directions (e.g. forward and backward). For treadmill-type applications, such platforms generally only allow the user to simulate forward movement, or forward and backward movement. Although omnidirectional platforms that allow objects to move in a plurality of directions have been developed previously, there are many shortcomings in such devices. For example, existing platforms for omnidirectional movement may be complicated, for example by requiring separate motors to provide the omnidirectional capabilities. Other problems in existing platforms for omnidirectional movement may include the requirement for a large amount of space, generation of undesirable amounts of noise, and safety and cleanliness concerns due to large spaces between moving parts of the platform.

BRIEF SUMMARY

According to a first aspect of the disclosure a platform for providing omnidirectional movement includes a first moveable member, a second moveable member, and a drive system. The first moveable member has an exterior surface adapted to support an object and has a plurality of first surface features thereon, each first surface feature extending along at least a portion of a width of the exterior surface of the first moveable member. The second moveable member has an exterior surface adapted to support the object and has a plurality of second surface features thereon, each second surface feature extending along at least a portion of a width of the exterior surface of the second moveable member. The drive system is operably coupled to the first and second moveable members and is adapted to independently drive the first and second moveable members in a forward direction and a reverse direction. The plurality of first surface features and the plurality of second surface features are adapted to interact with the object to move the object in any direction along the exterior surfaces of the first and second moveable members when the drive system is driving at least one of the first and second moveable members. The first surface features may be first grooves in the exterior surface of the first moveable member, and the second surface features may be second grooves in the exterior surface of the second moveable member. The first surface features may be first side surfaces configured to contact the object, while the second surface features may be second side surfaces configured to contact the object. The first moveable member may include a plurality of first protruding members defining the first side surfaces, and the second moveable member may include a plurality of second protruding members defining the second side surfaces. The first moveable member may be a first belt, or a group of first belts, and the second moveable member may be a second belt, or a group of second belts. The drive system may include a first drive member extending along a first longitudinal axis and configured to rotate about the first longitudinal axis, and a second drive member extending along a second longitudinal axis and configured to rotate about the second longitudinal axis. The first longitudinal axis may be substantially parallel to the second longitudinal axis. Each first groove may extend along an entire width of the exterior surface of the first moveable member, and each second groove may extend along an entire width of the exterior surface of the second moveable member. A direction of movement of the object along the exterior surface of the first moveable member and along the exterior surface of the second moveable member may be dependent upon a speed of movement and a direction of movement of the first moveable member and a speed of movement and a direction of movement of the second moveable member. When the first moveable member is a first belt and the second moveable member is a second belt, the first and second belts may each be wrapped around a first drive member and a second drive member of the drive system. When the first moveable member is a group of first belts and the second moveable member is a group of second belts, each first belt being may be positioned adjacent to at least one belt in the group of second belts. In one example, each belt in the group of first belts is positioned in an alternating fashion with respect to the belts in the group of second belts. The plurality of first grooves may each extend at a first oblique angle with respect to the forward direction. The plurality of second grooves may each extend at a second oblique angle with respect to the forward direction, the first oblique angle being substantially equal to the second oblique angle.

In some examples of the platform described in the paragraph above, the first moveable member is a group of first belts having substantially identical exterior surfaces, and the second moveable member is a group of second belts having substantially identical exterior surfaces. The exterior surface of the first moveable member may be substantially a mirror image of the exterior surface of the second moveable member. When the first moveable member is a group of first belts, a line extending along each first groove of a first belt in the first group of belts may be aligned with a corresponding first groove of a second belt in the first group of belts. Each first groove in the first moveable member may be spaced an equal distance from an adjacent first groove in the plurality of first grooves. In other examples, a spacing between a first pair adjacent first grooves is different than a spacing between a second pair of adjacent first grooves, the first pair being adjacent the second pair.

According to another aspect of the disclosure, a system for providing omnidirectional movement may include the platform described in the two paragraphs above, as well as the object. The object may include a plurality of protrusions extending from a surface of the object, each protrusion may be adapted to contact the plurality of first surface features and the plurality of second surface features. The protrusions of the object may be adapted to fit within the plurality of first grooves and the plurality of second grooves. The plurality of protrusions may be positioned so that each protrusion is positioned at a vertex of a regular polygonal shape. In one example, the object is footwear configured to be worn by a user.

According to yet another aspect of the disclosure, a platform for providing omnidirectional movement includes a first moveable member including a plurality of first rollers, a second moveable member including a plurality of second rollers, and a drive system operably coupled to the first and second moveable members. Each first roller may be adapted to rotate about a corresponding first longitudinal axis and to support an object, while each second roller may be adapted to rotate about a corresponding second longitudinal axis and to support the object. The plurality of first rollers and the plurality of second rollers may together at least partially define a surface. The drive system may be adapted to independently drive the first and second moveable members in a forward direction and a reverse direction. The plurality of first rollers and the plurality of second rollers may be adapted to interact with the object to move the object in any direction along the surface when the drive system is driving at least one of the first and second moveable members. The first movable member may be a first chain including a plurality of first links coupled to one another, and the second moveable member may be a second chain including a plurality of second links coupled to one another. Each of the first links may support one of the first rollers, and each of the second links may support one of the second rollers. Each first longitudinal axis may extend at a first oblique angle with respect to the forward direction, and each second longitudinal axis may extend at a second oblique angle with respect to the forward direction. The first oblique angle may be substantially equal to the second oblique angle. In other examples, the first moveable member is a first belt supporting the plurality of first rollers, and the second moveable member is a second belt supporting the plurality of second rollers. The first oblique angle may be substantially equal to the second oblique angle. The first belt may include two lateral portions, each first roller extending between the two lateral portions of the first belt. The second belt may include two lateral portions, each second roller extending between the two lateral portions of the second belt. In other examples, each first roller includes two lateral rolling portions, the two lateral rolling portions of each first roller being positioned on opposite sides of the first belt. Similarly, each second roller may include two lateral rolling portions, the two lateral rolling portions of each second roller being positioned on opposite sides of the second belt. The two lateral rolling portions of each first roller may be coupled by a coupling member, the coupling member extending across a width of the first belt. In one example, the coupling member is a pin. In some examples, the first moveable member is a group of first belts, and the second moveable member is a group of second belts. Each belt in the group of first belts may be substantially a mirror image of each belt in the group of second belts. Each belt in the group of first belts may be substantially identical to one another, and each belt in the group of second belts may be substantially identical to one another. The drive system may include a first drive member extending along a first longitudinal axis and configured to rotate about the first longitudinal axis, and a second drive member extending along a second longitudinal axis and configured to rotate about the second longitudinal axis. The first longitudinal axis may be substantially parallel to the second longitudinal axis. The direction of movement of the object along the surface may be dependent upon a speed of movement and a direction of movement of the first belt, and a speed of movement and a direction of movement of the second belt. The platform described in this paragraph may be provided in a system for providing omnidirectional movement, the system may also include the object.

According to still another aspect of the disclosure, a platform for providing omnidirectional movement includes a first moveable member including first and second substantially rigid members, a second moveable member including third and fourth substantially rigid members, and first and second drive systems. Each rigid member of the first moveable member may have an exterior surface adapted to support an object, and each rigid member of the second moveable member may have an exterior surface adapted to support the object. The first drive system may be operably coupled to the first moveable member and adapted to drive the first and second rigid members along a first path of motion in a forward or reverse direction simultaneously but in an out-of-phase fashion. Similarly, the second drive system may be operably coupled to the second moveable member and adapted to drive the third and fourth rigid members along a second path of motion in the forward or reverse direction simultaneously but in an out-of-phase fashion. Each rigid member may be a plank. The exterior surfaces of the first, second, third, and fourth plank members may be adapted to interact with the object to move the object in any direction along the exterior surfaces while at least one of the first and second drive systems are moving corresponding plank members along a corresponding path of motion. The first and second paths of motion may each include a substantially straight component extending from a first end to a second end, and a return component extending from the first end to the second end. The return components may be substantially curved. The first drive system may be adapted to position at least one of the exterior surfaces of the first and second plank members along the substantially straight component of the first path of motion at all times. Similarly, the second drive system may be adapted to position at least one of the exterior surfaces of the third and fourth plank members along the substantially straight component of the second path of motion at all times. The exterior surfaces of the first and second plank members may each include a plurality of first grooves, and the exterior surfaces of the third and fourth plank members may each include a plurality of second grooves. The plurality of first grooves may each extend at a first oblique angle with respect to the forward direction, and the plurality of second grooves may each extend at a second oblique angle with respect to the forward direction. The first oblique angle may be substantially equal to the second oblique angle. The first plank member may be substantially identical the second plank member. Similarly, the third plank member may be substantially identical to the fourth plank member. The first plank member may be substantially a mirror image of the third plank member. In some embodiments, the first and second plank members each include a plurality of first rollers each adapted to rotate about a first longitudinal axis. The third and fourth plank members may each include a plurality of second rollers each adapted to rotate about a second longitudinal axis. The first and second longitudinal axes may both be oblique to the forward direction, and may be substantially equal to one another. A system for providing omnidirectional movement may include the platform described in this paragraph and the object. The object may have a width so that the object is capable of being supported by the first plank member and the third plank member simultaneously.

BRIEF DESCRIPTION OF THE DRAWINGS

FIG. 1H is a chart illustrating operational parameters of the platform of FIG. 1A.

FIG. 2G is a chart illustrating operational parameters of the platform of FIG. 2A.

FIGS. 4Cb, 4Db, 4Eb, and 4Fb each illustrate a position of the other plank of a member of the platform of FIG. 4A as it cycles through the path shown in FIG. 4B.

DETAILED DESCRIPTION OF THE DISCLOSURE

Figure 1A:
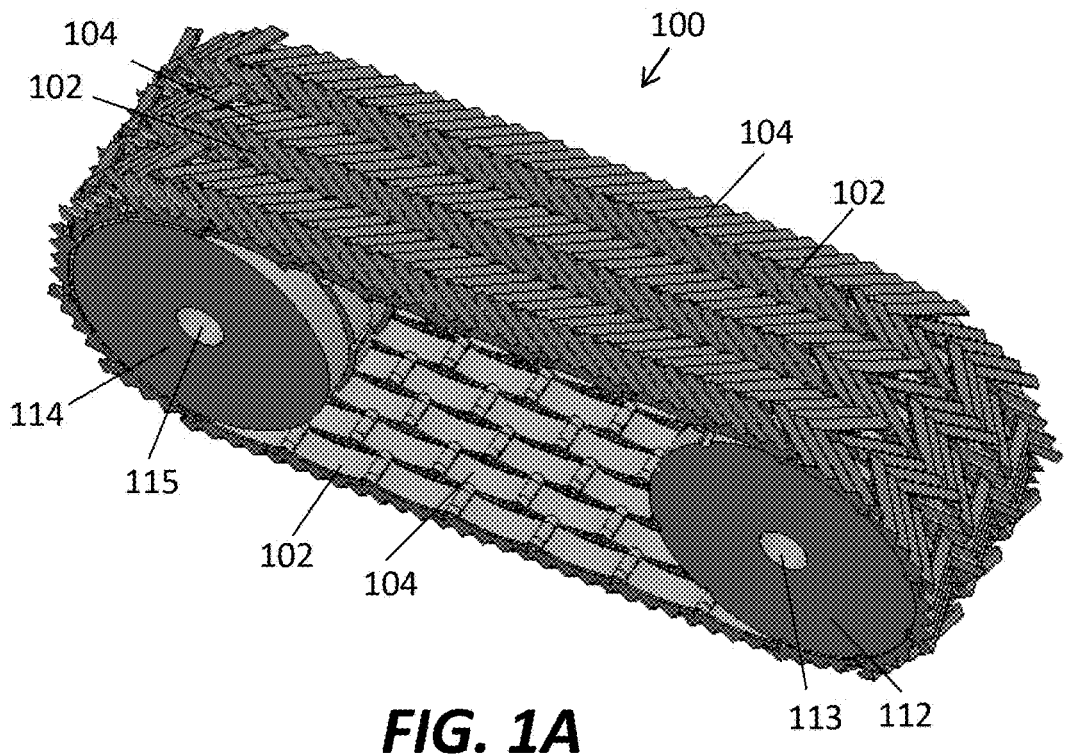
FIG. 1A is a schematic perspective view of a platform for omnidirectional movement according to an embodiment of the disclosure.

A platform 100 for omnidirectional movement is illustrated in FIG. 1A according to a first embodiment of the disclosure. Platform 100 may include a plurality of first belts 102 and a plurality of second belts 104. In the embodiment shown, three first belts 102 and three second belts 104 are provided in an alternating fashion. It should be understood that although the term "alternating" is used, as few as one belt 102 and one belt 104 may be suitable and the belts need not be directly adjacent one another. In other words, any combination of belts 102 and 104 may be suitable and there may be space between adjacent belts 102 and 104 as long as an object can be supported on one belt 102 and one belt 104 simultaneously. It should be understood that the concept of an object being "supported," when used in this context, may include an object engaging a surface or being in contact with a surface, without the surface necessarily functioning to carry the weight of the object in any significant capacity. Each belt 102, 104 may form a continuous or endless loop. The ends of each belt 102, 104 may be coupled over drive members 112, 114. Drive member 112 may be configured to drive each belt 102, while drive member 114 may be configured to drive each belt 114, as described in greater detail below.

Figure 1B:
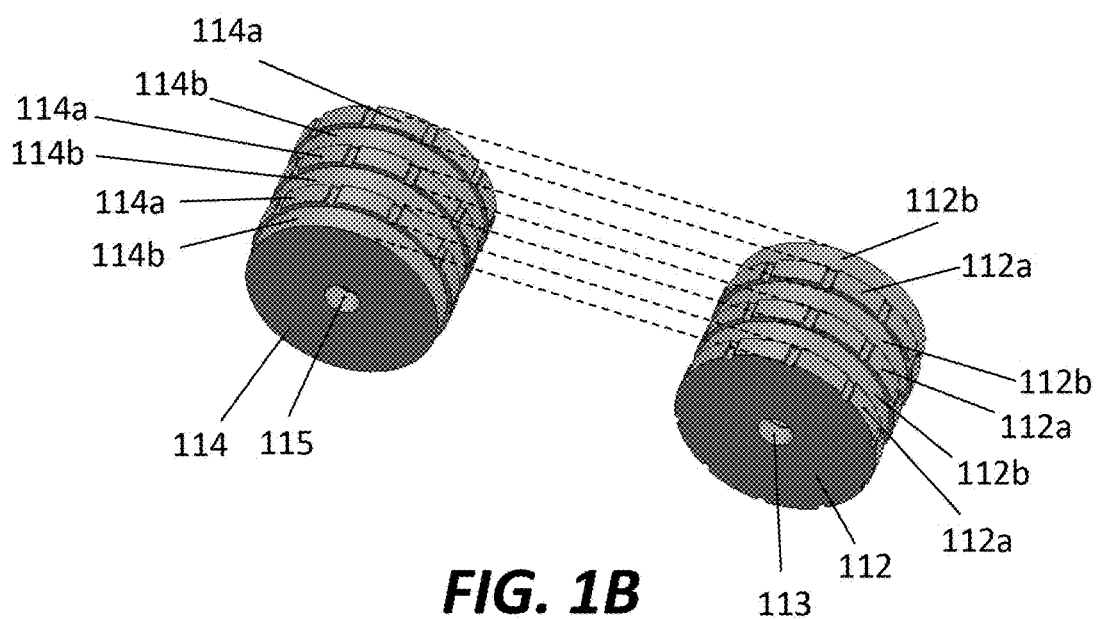
FIG. 1B is a schematic perspective view of drive members of the platform of FIG. 1A.

FIG. 1B illustrates platform 100 with the outline of belts 102, 104 provided in dashed lines to illustrate the drive members 112, 114 more clearly. Drive member 112 may take the general shape of a cylinder with a plurality of individual members that together form the drive member 112, with the number of individual members preferably equaling the total number of belts 102, 104 supported by the drive member 112. In other words, drive member 112 may include six individual members that support a total of six belts in one embodiment. In the illustrated embodiment, drive member 112 includes three active members 112a that support and drive belts 102, and three passive members 112b that support drive belts 104, with the active members 112a alternating with the passive members 112b. Active members 112a may be substantially cylindrical with a surface that engages and drives belts 102. For example, the surfaces of active members 112a may include texture, such as ridges or other high friction surfaces, or may be provided with a gear teeth system, a sprocket system, or other similar features to engage with a bottom surface of belt 102. On the other hand, passive members 112b may be provided with a smooth surface to support a bottom surface of belts 104. It should be understood that passive members 112b may alternately take the form of bearings or any structure that performs the function described. Preferably, a rod or other driver 113 passes through a longitudinal center of all of the individual members 112a, 112b of drive member 112. However, driver 113 may only be rigidly coupled to active members 112a, so that torque on drive member 112 is transmitted to each active member 112a. On the other hand, passive members 112b may be substantially free to rotate with respect to driver 113, for example by the use of low friction contact surfaces and/or lubricants, so that rotation of the driver 113 does not impart significant torque to passive members 112b. As should be understood, although a motor is not illustrated, a motor may be operably coupled to driver 113 to cause driver 113 to rotate at a desired speed, in a desired direction, and for a desired length of time and/or on a timed schedule. It should be understood that other configurations of drive members 112, 114 may be suitable. For example, the bands 102 need not be supported in a way that results in bands 102 having a concentric turning point compared to bands 104. Still further, platform 100 could alternately be driven by members that are both positioned toward one end of the platform, with the two drivers not being concentrically aligned. In other words, the first drive member could be offset a distance in either direction of movement of the bands from the second drive member, with bearing or passive members being provided only where support for the bands is necessary and free rotation is desired.

Drive member 114 may have substantially the same construction as drive member 112. However, the position of active members 114a and passive members 114b may be opposite compared to drive member 112. With this configuration, the direction and speed of belts 102 may be controlled by driver 113, with passive members 114b of drive member 114 supporting belts 102 but not causing any significant movement of those belts 102. Similarly, the direction and speed of belts 104 may be controlled by driver 115, with passive members 112b of drive member 112 supporting belts 104 but not causing any significant movement of those belts 104. It should be understood that although passive members 112b and 114b are shown without friction surfaces, any surface may be suitable as long as rotation of driver 113 does not result in any significant movement of belts 104, and as long as rotation of driver 115 does not result in any significant movement of belts 102. With this configuration, driver 113 is capable of controlling the speed and direction of the belts 102 while driver 115 is capable of independently controlling the speed and direction of the belts 104, so that belts 102 may move in the same or opposite direction and at the same or different speed than belts 104. It should be understood that although each individual member of drive member 112 is shown as abutting adjacent individual members, space may be provided between adjacent members so that the side surfaces of the members are not in contact with directly adjacent members, so that rotation of members 112a does not impart motion on members 112b. The same may be true for drive member 114. Although drive members 112 and 114 are described as each rotating about longitudinal axes that are parallel to one another, it should be understand that in some embodiments, the driver members 112 and 114 do not need to rotate about longitudinal axes that are parallel to one another. The same is true for other embodiments of omnidirectional platforms described herein that include similar drive members.

It should be understood that, in use, platform 100 may be positioned on a stand or other support to keep the belts 102, 104 from contacting a floor surface. Such a support may be coupled to one or both drivers 113, 115, although other types of supports in other positions that provide the same function of lifting the belts 102, 104 away from the ground may be suitable.

Figure 1C:
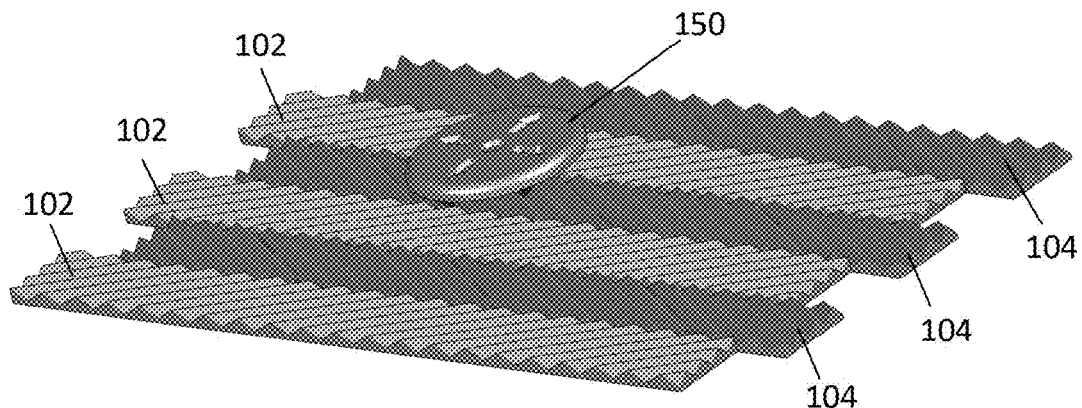
FIGS. 1C and 1D are top perspective and top views, respectively, of portions of bands of the platform of FIG. 1A.
Figure 1D:
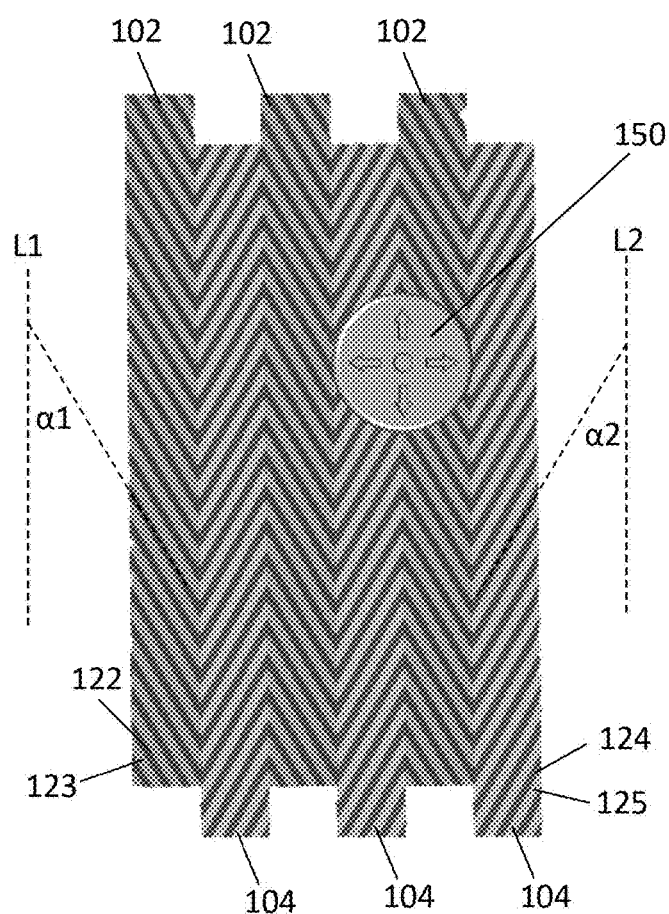

Each of the belts 102 may be substantially identical to one another, and each of the belts 104 may be substantially identical to one another, although belts 102 may have different characteristics than belts 104. In some embodiments, each belt 102 may be a mirror image of each belt 104. Belts 102 and 104 may all have the same width, although such a feature may not be necessary. As best shown in FIG. 1C, belts 102 and 104 may include surface characteristics that allow an object 150 positioned thereon to move in any direction along the surface of platform 100 while restricting movement of each belt 102 and 104 to either the forward or reverse direction. Moving in any direction along the surface may refer to the ability of an object to move in up to 360 degrees along the surface in two dimensions, although movement in a third (e.g. height) dimension may also be possible in some configurations. In particular, the upper or top surface of each belt 102 includes a plurality of grooves 122 running at an angle $\alpha 1$ to a line L1 parallel to the center of the belt 102. Similarly, the upper or top surface of each belt 104 includes a plurality of grooves 124 running at an angle $\alpha 2$ to a line L2 parallel to the center of the belt 104. Preferably the angles $\alpha 1$ and $\alpha 2$ are substantially equal to one another. In one particular embodiment, $\alpha 1$ and $\alpha 2$ are each about 30 degrees, so that when a groove 122 meets a groove 124, an angle of approximately 60 degrees is formed between the grooves. The embodiment of surface characteristics shown and described in connection with FIGS. 1A-F is only one embodiment of the invention. For example, in some embodiments, the grooves 122 and 124 do not need to form straight lines and may be curved. Still further, although angles $\alpha 1$ and $\alpha 2$ are illustrated as being equal to one another, in some embodiments angles $\alpha 1$ may be different than angles $\alpha 2$. Each groove 122, 124 may extend along the entire width of the surface of the belt in an uninterrupted fashion, although in some embodiments the grooves 122, 124 may extend along less than the entire width of the surface of the belt.

Figure 1E:
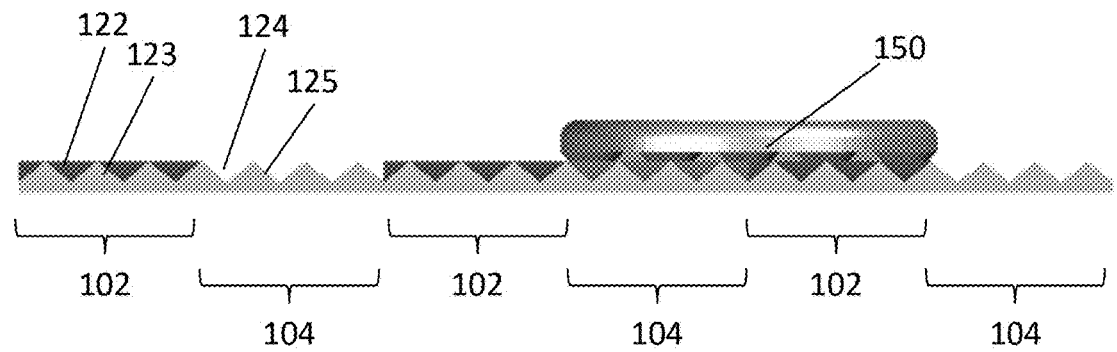
FIGS. 1E and 1F are rear and side views of the portions of the bands of FIGS. 1C-1D.
Figure 1F:
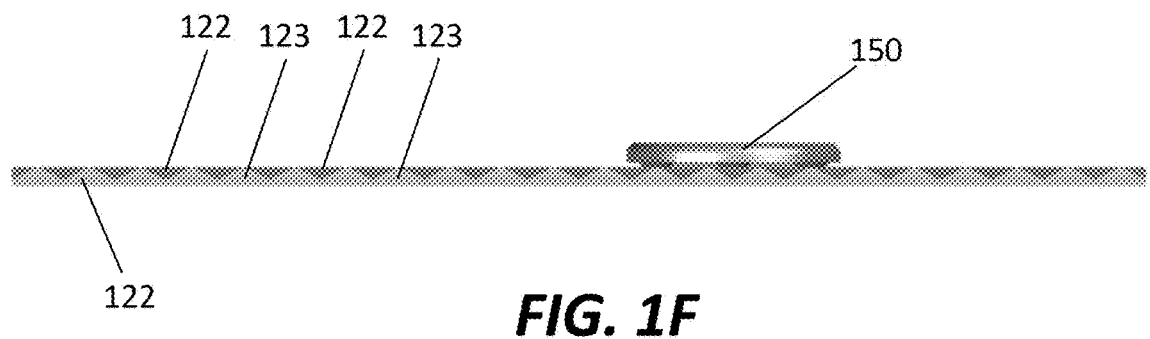

FIGS. 1E and 1F show rear and side views, respectively, of the object 150 positioned on the belts 102, 104. As seen in these views and in FIG. 1C, the grooves 122, 124 may have substantially triangular shapes with the ridges 123 between each pair of adjacent grooves 122, and the ridges 125 between each pair of adjacent grooves 124, having substantially triangular shapes as well. In the illustrated embodiment, all of the grooves 122, 124 and all of the ridges 123, 125 are equally and regularly spaced as one another. However, as explained in additional detail below, regular and equal spacing between adjacent grooves 122 is not necessary, nor is regular and equal spacing between grooves 124 necessary. Further, although the grooves 122, 124 and ridges 123, 125 are all shown to have a substantially triangular or "V"-shape, other shapes may be suitable, such as rounded (e.g. half cylindrical) or square shapes. Preferably, the shape of the grooves 122, 124 is any shape that allows for positioning of the protrusions 152 of object 150, described in greater detail below, to sit in the grooves. As is explained below, the grooves 122, 124 are configured to interact with an object 150 to provide movement of the object in a desired direction and at a desired speed, which direction and speed may be at least partially dependent on velocity of the belts and the angles of the grooves.

Figure 1G:
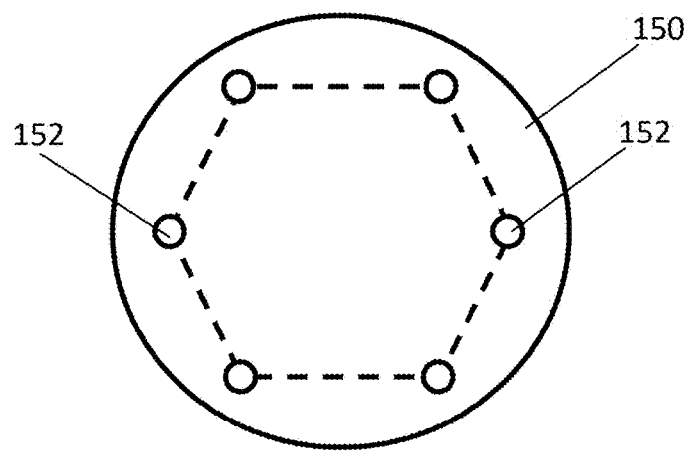
FIG. 1G is an underside view of an object for use with the platform of FIG. 1A.

The underside of object 150 is schematically illustrated in FIG. 1G. Although object 150 is illustrated as having a substantially round shape, it should be understood that any shape may be suitable. Object 150 may include a plurality of protrusions 152 extending substantially orthogonal to the bottom surface of object 150. In the illustrated embodiment, protrusions 152 have a conical or frustoconical shape, although other shapes may be suitable. As illustrated by the dashed line in FIG. 1G, object 150 includes six protrusions 152 each aligned along the vertices of a regular hexagon, so that the angle of a line connecting any three adjacent protrusions 152 is approximately 120 degrees. As best shown in FIGS. 1C, 1E, and 1F, object 150 may be placed on platform 100 so that each protrusion 152 rests within either a groove 122 of belt 102 or a groove 124 of belt 104. It should be understood that although object 100 is shown with six protrusions 152 at the vertices of a hexagon, other alternatives may be suitable. In some embodiments, as few as two or as few as three protrusions may be utilized, and those protrusions, if there are three, may be positioned at the vertices of a triangle, such as an equilateral triangle. In still other embodiments, four or more protrusions may be provided that may be positioned at the vertices of any regular polygon (e.g. four protrusions at the vertices of a square, five protrusions at the vertices of a regular pentagon, etc.). Further, although the protrusions of the object are described above as being equal in number to the number of vertices of the regular polygon along which the protrusions are positioned, this does not necessarily need to be the case. For example, any number of protrusions numbering two or greater may be used. It may be preferable, although not necessary, for those protrusions to be positioned at the vertices of a regular polygon and designed with the grooves 122, 124 of bands 102, 104 so that each protrusion can seamlessly transition from the groove 122 of one band 102 to a groove 124 to another band 104. Still further, protrusions 152 may not even need to be provided on the underside of object 150, as long as the underside surface of object 150 has surface properties that allow the underside of object 150 to ride along the grooves 122 (or 124) due to engagement with the adjacent ridges 123 (or 125). Still in addition, although having protrusions positioned on the vertices of a regular polygon may allow for the described transitions, the protrusions need not be positioned on such vertices to allow for transitioning between belts 102, 104, particularly if the protrusions are positioned at points where a line extending through groove 102 intersects with a line extending through groove 104.

Referring back to FIG. 1D, in the illustrated embodiment of platform 100, a line drawn through a groove 122 of one band 102 will extend through grooves 122 of the other bands 102, while a line drawn through a groove 124 of band 104 will extend through grooves 124 of the other bands 104. However, such a feature is not necessarily required in other embodiments.

With the protrusions 152 of object 150 each sitting within a groove 122 or 124, driver 113 may cause belts 102 to move at a first speed and in a first direction, with driver 115 causing belts 104 to move at a second speed and in a second direction. As the belts 102, 104 move, the grooves 122, 124 move as well. The movement of the grooves 122, 124 forces the object 150 to move based on how the grooves 122, 124 interact with the protrusions 152. For example, referring to FIG. 1H, if belts 102 and 104 move forward at the same speed, object 150 will similarly move forward at that speed. On the other hand, if belts 102 and 104 both simultaneously move in the reverse direction at the same speed, object 150 will move in the reverse direction at that speed. Object 150 may be moved laterally by causing belts 102 and 104 to move in opposite directions (one forward, on reverse) at the same speed. For example, if belts 102 move forward and belts 104 move in the reverse direction at the same speed, object 150 will move laterally to the right. The object 150 may be moved laterally to the left by moving belts 102 in the reverse direction and belts 104 in the forward direction at the same speed. It should be understood that the examples of movement of object 150 described in this paragraph and illustrated in FIG. 1H are based on the illustrated embodiment, and in other embodiments, for example with differently spaced and/or angled grooves, other relative speeds of the bands may result in the desired motion. Intermediate angles of movement of object 150 may be attained by adjusting the speed and direction of the belts 102 relative to belts 104, resulting in a full 360 degrees of motion being possible. In the illustrated embodiment of platform 100, the relative speeds of the belts 102 and 104 could be adjusted to provide movement of object 150 in the desired direction. Thus, it should be understood that object 150 may be moved in any direction along the top surface of platform 100 by choosing the correct direction of movement and speed of each group of belts 102, 104. Preferably, as object 150 moves in any particular direction, and as a particular protrusion 152 moves along a particular groove of one belt, as that protrusion 152 reaches the edge of one belt, it will substantially seamlessly move into a groove of the next belt. In some embodiments, protrusions 152 may include a bearing mechanism, such as a ball bearing, at the point of contact between the protrusion 152 and the surface defining the groove 122 or 124, to aid smooth movement of the protrusion along the groove 122 or 124. Although one particular example of grooves 122 and 124 are illustrated for platform 100, it should be understood that other patterns and angles of grooves, whether straight or not, may be designed to work with a particular object to allow for the desired capability of motion. It should further be understood that both groups of belt do not necessarily need to move simultaneously to allow for movement of an object. For example, if belt 102 is moving forward and belt 104 is static, the object 150 would move forward and to the right along the angle of the grooves 124 of the static belt 104, the movement of the object resulting from the movement of belt 102 and the engagement of the object with grooves 122, 124. Similarly, if belt 102 is moving reverse and belt 104 is static, the object 150 would move in reverse and to the left along the angle of the grooves 124 of the static belt 104, the movement of the object resulting from the movement of belt 102 and the engagement of the object with grooves 122, 124.

Platform 100 may provide a number of benefits and may have a variety of applications. As described above, platform 100 provides the capability to move object 150 in any direction relative to the surface of platform 100, while using only two drive members 112, 114 which rotate along longitudinal axes that are parallel to one another. However, as described above, other drive systems may be used which do not include two drive members that rotate along longitudinal axes that are parallel to one another. In embodiments that do include drive members rotating along parallel longitudinal axes, such a configuration may reduce the size and complexity of platform 100 compared to other omnidirectional platforms. For example, platform 100 does not need to have one drive or set of drives dedicated to motion in a first direction, with a second drive or set of drives dedicated to motion in the direction orthogonal to the first direction. In other words, all belts 102, 104 can move in the same two directions—forward and reverse—while enabling 360 degrees of motion of an object positioned on the platform 100. Still further, although belts 102 may travel in a direction relative to belts 104, each belt 102, 104 remains within substantially the same volume of real space. In other omnidirectional platforms, belts may travel in real space with respect to one another, continuously engaging and disengaging creating additional complexity and often a great deal of additional noise which may be undesirable. In addition, platform 100 may provide for additional safety and cleanliness compared to other omnidirectional platforms. In one example, the spacing between adjacent belts 102, 104 is small, which may reduce the likelihood that an item may fall between adjacent belts and into the internal mechanisms of platform 100. Similarly, such spacing as well as lack of movement of belts 102 relative to belts 104 in real space may reduce the likelihood of a user becoming pinched by or otherwise caught between any components of platform 100.

Although platform 100 may be used for any suitable application, platform 100 may be useful for at least two particular applications. For example, platform 100 may be particularly useful in transporting objects such as boxes or other containers in a warehouse-type facility to move the objects from an initial position to a desired final position which may be anywhere along the plane defined by the top surface of platform 100. For this application, one or more objects 150 may be used to facilitate movement of a container, for example by having the container sit or otherwise be positioned on object(s) 150, which in turn interface with the grooves 122, 124 of belts 102, 104.

Platform 100 may be also used in other applications, such as for allowing an individual to simulate walking, running, or other movement while maintaining a substantially static position in real space. This type of use may include exercise, rehabilitation, or simulation for example in conjunction with a virtual reality system, such as a gaming system. In order to allow platform 100 to be used as an omnidirectional treadmill device, a user may be equipped with shoes or similar apparel that includes protrusions similar to protrusions 152 of object 150. For example, shoes may include a device substantially identical to object 150 coupled to the bottom of the soles of shoes 150 to allow for interaction between the grooves 122, 124 of belts 102, 104 with the individual standing on platform 100. In order to help ensure that protrusions 152 are likely to engage within the grooves 122, 124 as desired, object 150 may be provided such that it is freely rotatable about a point located at the center of the protrusions 152 (or in other words, the center of the hexagonal shape shown in FIG. 1G), such that as a user's foot plants onto the top surface of platform 100, protrusions 152 may naturally find and situate within corresponding grooves 122, 124. Such a system may also allow a user to rotate or pivot a foot that is already planted on the surface of platform 100 with protrusions 152 situated in grooves 122, 124. Still further, shoes or similar apparel may be provided with an array of protrusions 152 that may protrude beyond the bottom surface of the shoe when clearance is available, and otherwise remain retracted into bottom surface or sole of the shoe when clearance is unavailable. With this configuration, protrusions in contact with ridges 123 may remain retracted within the sole of the shoe, while protrusions adjacent grooves 122, 124 may drop within to those grooves to allow for the movement of belts 102, 104 to allow for the desired engagement to be provided based upon the speed and direction of belts 102, 104. If retractable protrusions 152 are utilized, it may be beneficial to provide the grooves 122, 124 with a taper at or near the edges of the belt, with the surface of the taper facilitating the retraction of the protrusions as they near the edge of a belt. It should be understood that, with respect to virtual reality-type applications, platform 100 may be coupled to a computer or other computing system with a processor that coordinates the direction and speed of the belts 102, 104 with a virtual scenario, such as a moving image displayed on a screen or displayed on a headset worn by a user. In other scenarios, as the user moves in a direction in the real world, preferably with corresponding movement in the virtual world, the platform may compensate for that movement in order to bring the user toward a center part of the platform in the real world, such that the user remains in a substantially static location in the real world. Computing systems may also facilitate operation of the platform 100 on a desired time schedule. It should further be understood that, although the use of a rotatable object 150 may have certain benefits in virtual-reality or treadmill type applications, that configuration may also be useful in other applications such as in a system to move packages or other items from an initial location to a second desired location.

It should be understood that an object 150 without protrusions may also be guided in any direction along the surface of platform 100 if the object 150 and/or the structures defining the grooves include elasticity. For example, if a user is wearing a shoe with an elastic rubber sole, the ridges 123, 125 may support the mass of the user and the shoe, with the unsupported portions of the sole deforming due to their elasticity and extending a distance into grooves 122, 124, such that the material extending into the grooves is guided along the grooves as the belts 102, 104 move relative to one another.

Although the term belt is used in connection with platform 100, it should be understood that other structures may be used to provide similar or identical surface characteristics, such as grooves 122, 124 and ridges 123, 125 of belts 102, 104. In one example, rather than using belts that each form a continuous or endless loops, a plurality of smaller, more rigid members that are chained together may be used. In this example, the end of one rigid member may be coupled to the end of another rigid member, for example by a pin or pins that provide a hinged connection. The rigid members may be coupled to form a continuous or endless loop and be driven by a mechanism similar or identical to that described in connection with platform 100. As the rigid members are driven in either direction, the rigid members on the top of the platform form a continuous surface substantially identical to the top surface of platform 100, providing a similar or identical function with slightly different structure.

In some examples, it may be particularly important to help minimize the spacing of any gaps between belts 102, 104 for external items, such as dust, crumbs, shoelaces, etc., to fall into which may hinder the functionality of platform 100 or potentially provide for possible danger to a user. In one example, the gaps between adjacent belts 102 may be functionally or effectively removed by providing a low friction sheet member that extends over the entire top surface of platform 100. For example, a thin elastomeric sheet may be provided, preferably with low friction on both the top and bottom surfaces, over the top surface of platform 100. The sheet may be coupled to points of platform 100 other than belts 102, 104, or to external support members provided specifically for coupling to the sheet. In this embodiment, the sheet may sit directly on or very close to the top surface of belts 102, 104 positioned on the top surface of platform 100, so that as the belts 102, 104 move forward and/or reverse, the sheet remains stationary. Protrusions 152 of object 150 may fit into corresponding grooves 122, 124 with the sheet interposed between the protrusions 152 and the grooves 122, 124 and ridges 123, 125 of belts 102, 104. With this configuration, object 150 may move with respect to platform 100 as belts 102, 104 are driven, with the object 150 remaining in contact only with the sheet during movement about the platform 100. This may provide for the same functionality as described above for platform 100, while eliminating any gaps between adjacent belts 102, 104 which may increase the safety of the platform 100, while maintaining cleanliness and effectiveness of the platform 100 and extending its longevity.

Although platform 100 is shown with six belts 102, 104, it should be understood that more or fewer belts 102, 104 may be used. For example, an odd or even number of belts may be used, but regardless of the number of belts used, object 150 should be able to be in simultaneous engagement with at least one belt 102 and one belt 104 to allow lateral motion of object 150. Also, although drive members 112, 114 each with six individual members are shown, more or fewer individual members may be used with each drive member, preferably a number that corresponds to the number of belts 102, 104 used.

Figure 1I:
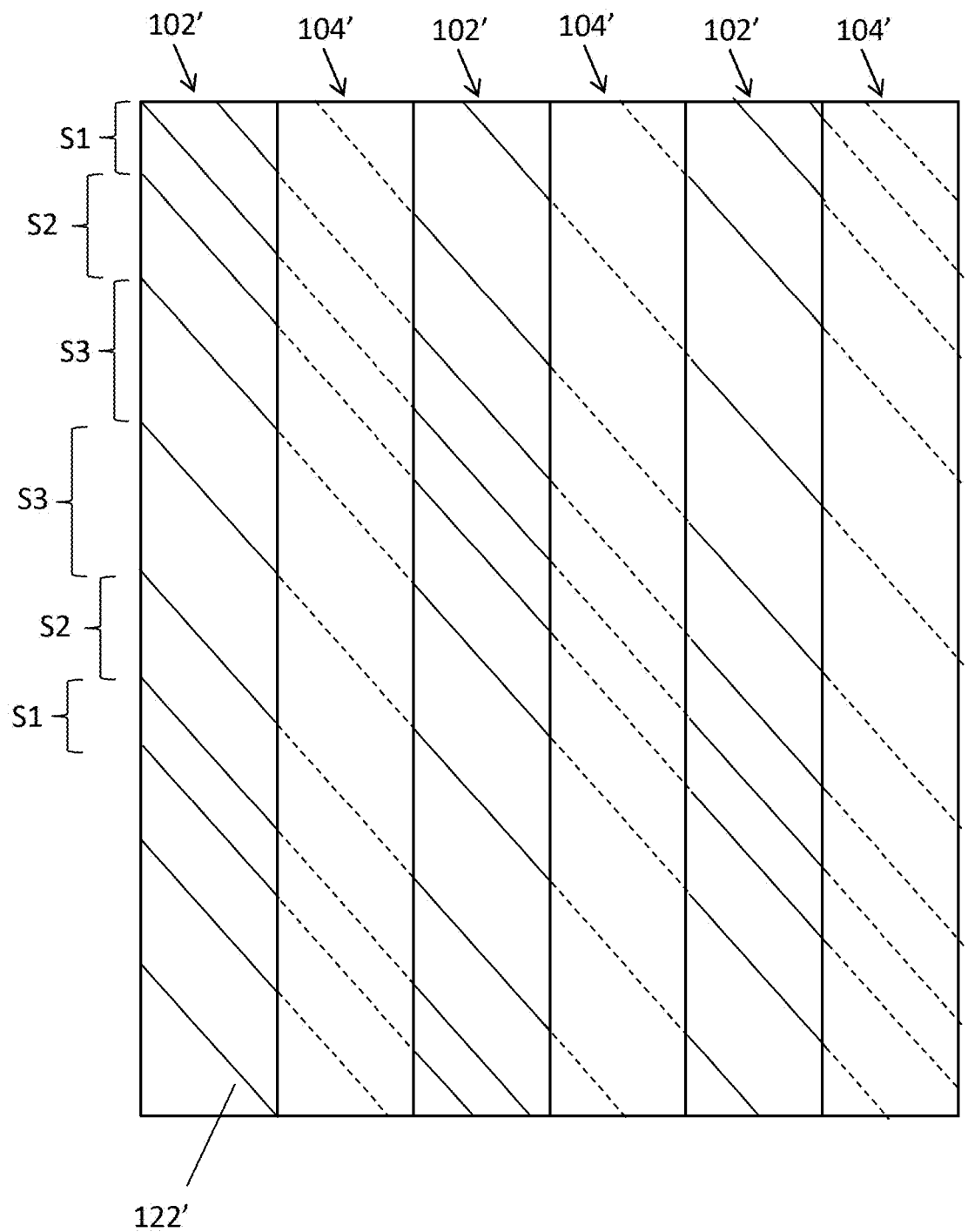
FIG. 1I is a schematic view of an alternate pattern of grooves on belts similar those in the platform of FIG. 1A.

FIG. 1I illustrates a platform system similar to platform 100 with belts 102' and 104' that include grooves with different spacing than shown for platform 100. In FIG. 1I, the grooves of belts 104' are omitted for illustrating a concept. In particular, it is preferably that the grooves 122' of each belt 102' align with the grooves 122' of the other belts 102' if the grooves are substantially straight. The dashed lines on belts 104' are purely for illustrating the alignment between grooves 122' of the belts 102'. As can be seen, adjacent grooves 122' may have a small first spacing S1, a medium second spacing S2, and a large third spacing S3. The spacing may then reverse from the large third spacing S3, to the medium second spacing S2 to the small first spacing S1. This pattern may effectively result in a repeating sine wave pattern of spacing. Although grooves are not shown for belts 104', the grooves in belts 104' may have a mirror pattern of those in belts 102', or a different pattern depending, which may depend for example on whether or not the object to be placed on the platform has protrusions (or pegs), and if the pattern of the protrusions if they are included.

In order to determine where the protrusions of an object may be situated in order to allow for smooth transition from the groove of one belt to the groove of an adjacent belt, a plot similar to that shown in FIG. 1I may be created, except with the grooves of both belt 102' and 104' represented. In other words, a line for each groove 122' may be created extending along both belts 102' and 104'. Similarly, a line of each groove of belt 104' may be created extending along both belts 102' and 104'. Each point of intersection between a line representing a groove 122' of belt 102' and a line representing a groove of belt 104' represents a point at which a protrusion or peg of an object may be situated so that the protrusion will always transition from one belt 102' to the next belt 104' (or vice versa) during forward and/or reverse movement of the belts, at any relative speed of rotation ratio between the two drive systems. It should thus be understood that in embodiments in which protrusions of an object are used to mate with grooves, the protrusions need not be positioned at vertices of a regular polygon for smooth transition between belts, but such positioning may provide for additional rotational positions at which the object may contact the platform with the protrusions each sitting at one of the intersection points.

In some embodiments, it may be preferable to have an object with a relatively large number of protrusions in a rotationally symmetric pattern so that the protrusions may fall into grooves in a relatively large number of rotational positions. For example, the hexagon pattern described above may allow for the protrusions 152 of the object 150 to fit within a group of grooves 122, 124 in six different rotational positions. Providing more protrusions may be beneficial for certain applications, for example if shoes or other footwear include fixed protrusions. This may allow for a user to place a foot on the top of the platform in many different rotational positions so that the protrusions fall within the grooves. In order to accommodate the additional protrusions, it may be desirable to provide additional grooves, which may or may not follow the sine pattern described above, in order to provide for many positions in which the users foot my strike the platform and have protrusions meet with grooves. However, it should be understood that the particular sine pattern may not be necessary and other patterns may be suitable. Further, when using an array of retractable protrusions, such as those described above, additional groove patterns may be suitable because if a particular protrusion is unable to smoothly transition from a groove in one belt to a groove in an additional belt, that protrusion may just retract.

Other systems may use concepts and structures related to those described above to provide the capability of omnidirectional movement using two parallel (or in some cases non-parallel) drive members other than the belts 102, 104 of platform 100. For example, FIGS. 2A-D illustrate a portion of a platform 200 according to another aspect of the disclosure.

Figure 2A:
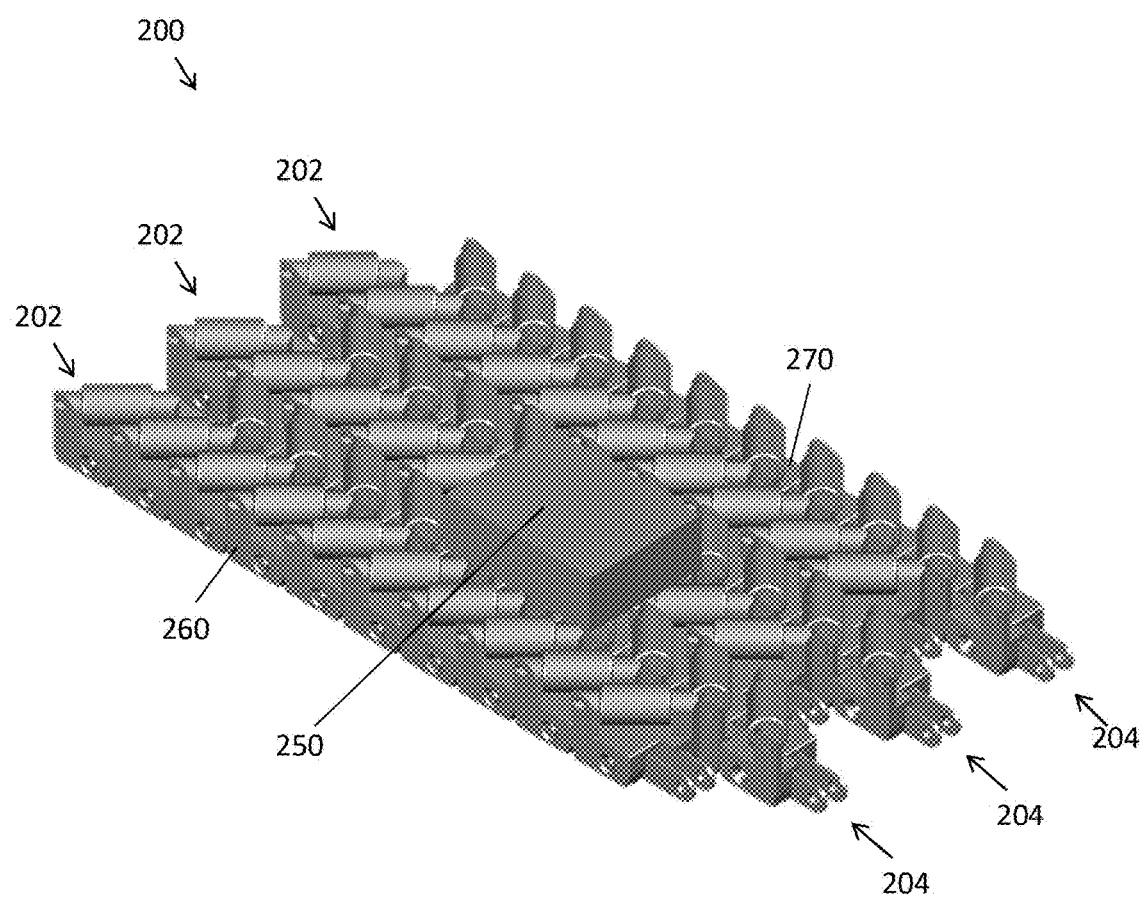
FIG. 2A is a perspective view of a platform for omnidirectional movement according to another embodiment of the disclosure.

Platform 200 may include two drive members with alternating active members and passive members substantially similar or identical to that described in connection with FIG. 1B. However, rather than using bands 102, 104, platform 200 may include chains of rollers. In the embodiment illustrated in FIG. 2A, three roller chains 202 that are substantially identical to one another are alternated with three roller chains 204 that are substantially identical to one another. Each roller chain 202 may include a plurality of individual links 260. Each individual link 260 may be identical to each other link 260. It should be understood that only a portion of each roller chain 202, 204 is illustrated in FIG. 2A for clarity of illustration. In use, each roller chain 202, 204 may form a continuous loop and be positioned on a drive system similar or identical to that described in connection with FIG. 1B above. Similar to platform 100, the roller chains 202 need not be directly adjacent roller chains 204, as long as a bottom surface of object 250 is capable of simultaneously contacting one roller chain 202 and another roller chain 204.

Figure 2B:
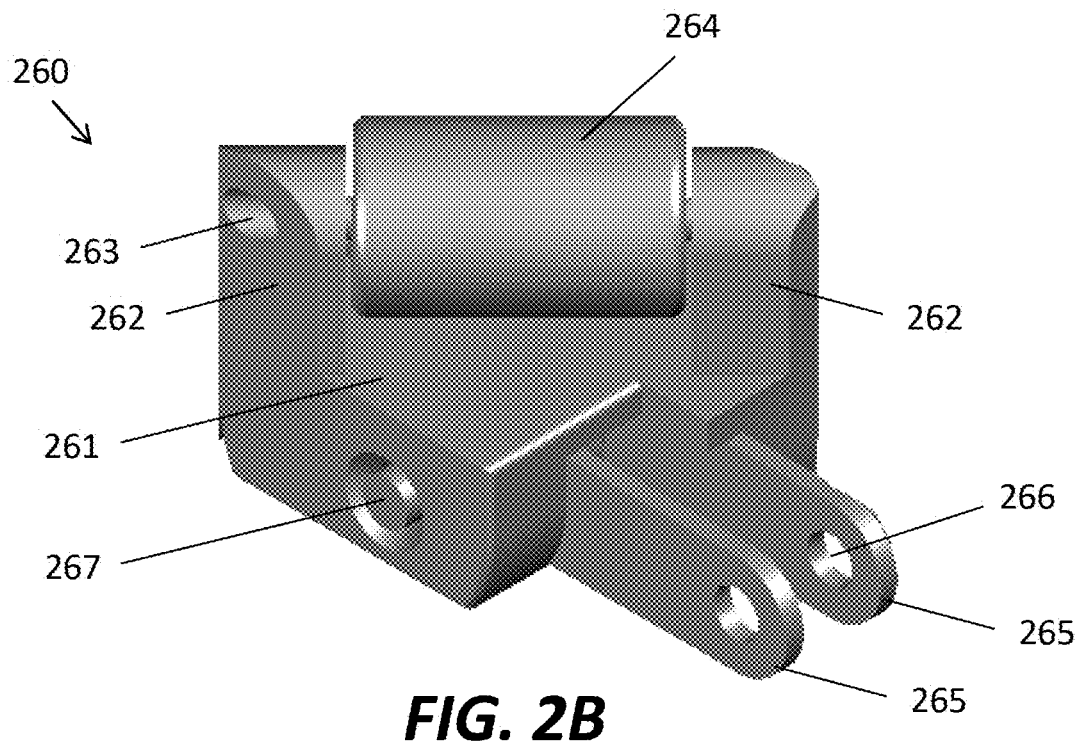
FIGS. 2B-C are perspective and top views, respectively, of an individual link of a chain of the platform of FIG. 2A.
Figure 2C:
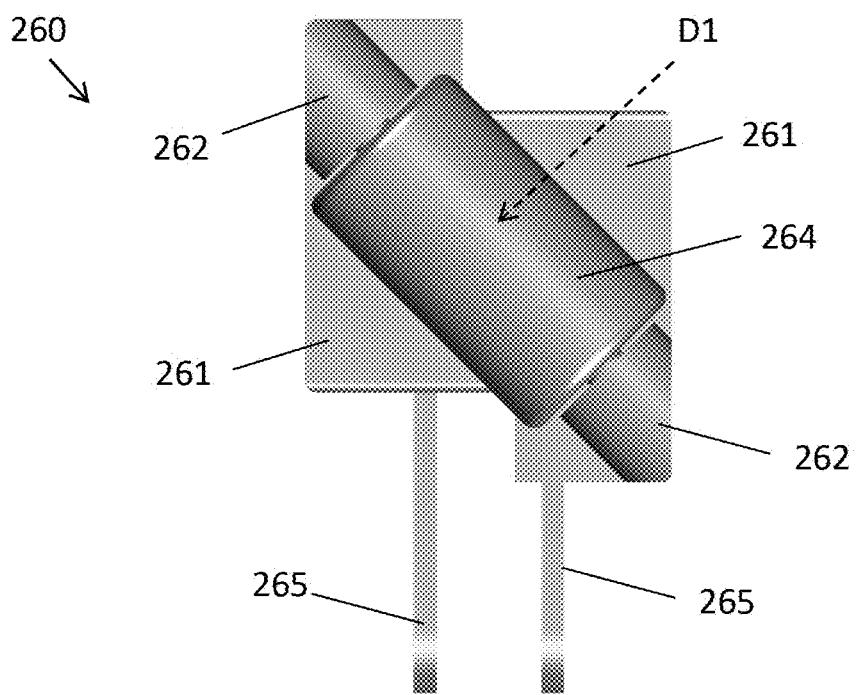
Figure 2D:
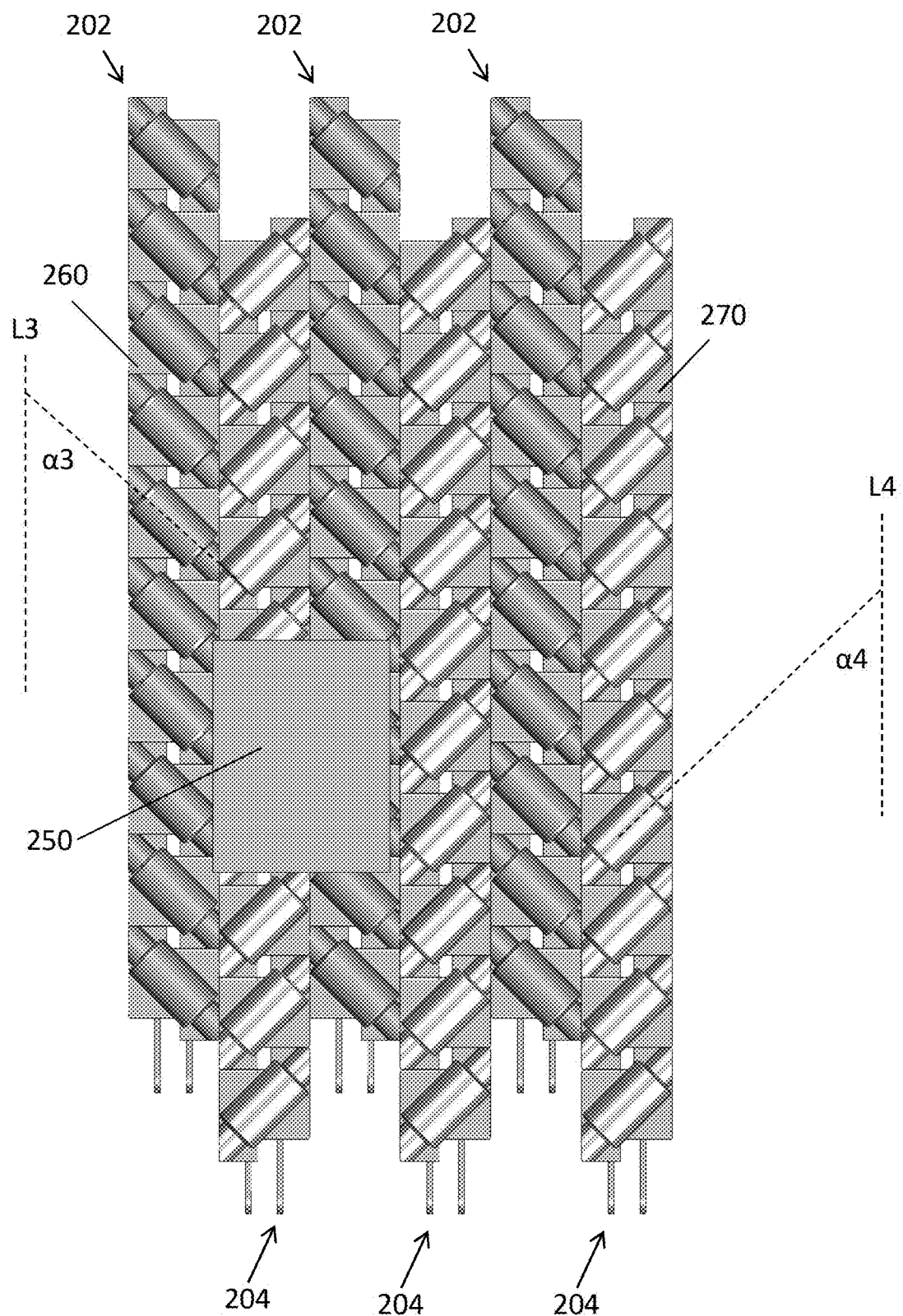
FIGS. 2D-F are top, side, and rear views, respectively, of the platform of FIG. 2A.
Figure 2E:
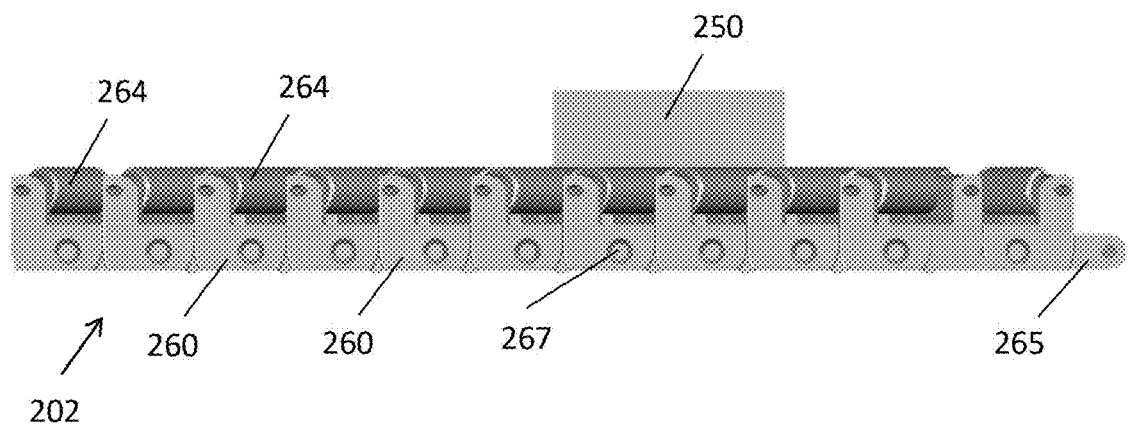
Figure 2F:
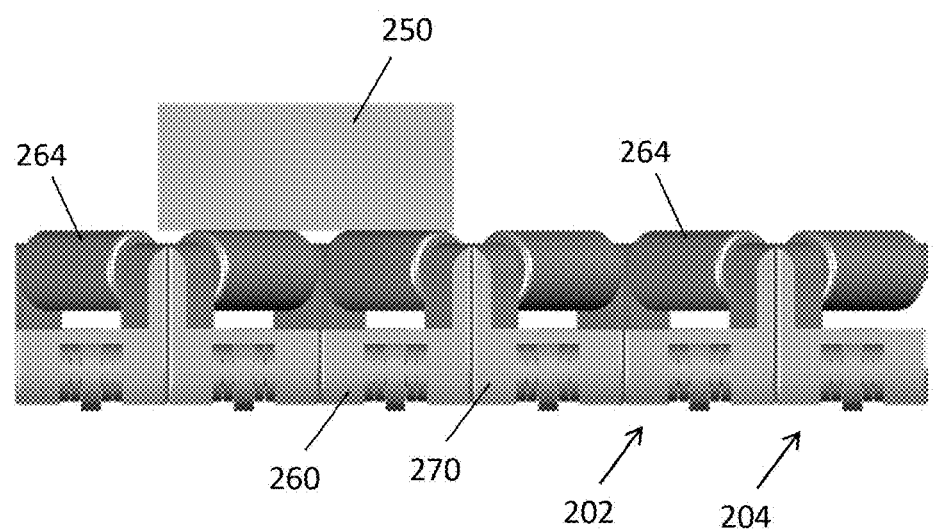

An individual link 260 of roller chain 202 is illustrated in FIGS. 2B-C. It should be understood that although only individual links 260 are described in detail, links 270 of roller chain 204 may have the same structure except in mirror configuration compared to links 260. Link 260 may include a base 261 with ends that are offset from one another. As shown in FIG. 2C, one side of base 261 may be offset a distance with respect to the other side of base 261 so that when multiple links 260 are chained together, as shown in FIG. 2D, the bases 261 of adjacent links 260 overlap with one another. Each base 261 may include two upwardly extending supports 262 at opposite corners of the base 261. Each support 262 may include an aperture 263 toward the top end thereof. A cylindrical roller 264 may be positioned between supports 262, with an axle of roller 264 securely received within apertures 263 so that roller 264 may freely rotate about its longitudinal axis without significant lateral movement toward or away from either support 262. Two prongs 265 may extend away form a first end of base 261, each prong 265 including an aperture 266 therein. The second end of base 261, positioned reverse from the first end, may include two slots that have a complementary shape to prongs 265, so that the prongs 265 of one link 260 may be received in corresponding slots in an adjacent link 260. A pin 267 may extend through base 261 and through the apertures 266 of the prongs 265 of an adjacent link 260, hingedly coupling one link 260 to an adjacent link 260. The bottom of each slot may be open so that one link 260 may rotate with respect to an adjacent connected link 260, for example as the links 260 move around a driver member from a top position toward a bottom position. However, the top of each slot is bounded by base 261 so that the links 260 have limited rotation, for example so that the links 260 on the top position of platform 200 remain substantially parallel to one another to provide a flat surface as the links 260 move from a first drive member toward a second drive member. It should be understood that the particular structures described above in connection with link 260 may be varied and any structures may be suitable that provide for support of roller 264 while allowing for roller 264 to rotate about its longitudinal axis.

Referring now to FIG. 2D, a top view of portions of six roller chains 202, 204 is illustrated. The roller chains 202, 204 in the view of FIG. 2D are on the top of platform 200, with other portions of platform omitted from view. Further, it should be understood that although roller chains 202, 204 would each form a continuous loop of individual links 260, 270 in an operative condition, only a portion of a continuous loop of individual links is shown in FIG. 2D. Each roller 264 of each link 260 of each roller chain 202 may be oriented so that the roller 264 is adapted to rotate about a longitudinal axis that is parallel to the axes of rotation of all other rollers 264 positioned on the top of platform 200. Similarly, each roller of each link 270 of each roller chain 204 may be oriented so that the roller is adapted to rotate about a longitudinal axis that is parallel to the axes of rotation of all other rollers in links 270 positioned on top of the platform 200. However, is some embodiments, the rollers 264 of roller chain 202 need not all rotate about axes that are parallel to one another, and the rollers or roller chain 204 need not all rotate about axes that are parallel to one another. Rollers 264 may have an axis of rotation that forms an angle α3 with respect to the forward or reverse direction of movement L3 of roller chains 202. The rollers of links 270, on the other hand, may have rollers with axes of rotation that form an angle α4 with respect to the forward or reverse direction of movement L4 of roller chains 204. In the illustrated embodiment, angles α3 and α4 are both about 45 degrees, with the axis of rotation of a roller 264 of link 260 forming an angle of about 90 degrees with the axis of rotation of a roller of a link 270. The angles of the rollers of links 260 and 270 may be thought of as providing similar functionality as the grooves 122, 124 of bands 102, 104 of platform 100. As such, many of the variations of the grooves 122, 124 described above may apply with equal force to the relative positioning of the rollers, and vice versa. For example, the angle of the roller 264 of link 260 need not be equal to the angle of the roller of link 270. Also, as with grooves 122, 124, any angle between 90 (perpendicular to the direction of movement of the roller chains 202, 204) and 0 (parallel to the direction of movement of the roller chains 202, 204) may be suitable to allow an object positioned thereon to have 360 degrees of available movement, with the particular angles affecting what relative speed of the roller chains 202, 204 should be used to achieve the desired direction and speed of movement of the object 250.

When platform 200 is in operation, roller chains 202 and 204 are each capable of movement in a forward or reverse directions of movement along axes parallel to L3 and L4. In addition to the movement of roller chains 202 and 204, rollers 264 of links 260 and rollers of links 270 are each free to rotate about their respective longitudinal axes. This combined movement of the rollers chains 202, 204 and the individual rollers provides forces that may allow an object 250 on the platform 200 to be moved in any direction along the top surface of platform 200 while maintaining as few as two separate drive mechanisms that may rotate along parallel axes. The movement of object 250 may be explained as follows. A first component of movement of the object 250 may be provided by the roller chain(s) moving in the forward or reverse direction, moving the object 250 along with the roller chain. A second component of movement of the object 250 is provided by the rollers of each individual link. Referring to FIG. 2C, object 250 is capable of movement with respect to link 260 in the direction D1 (or the direction opposite D1) because roller 264 is capable of freely rotating about its axis, and the object 250 is positioned on the roller 264. These two components of movement, as well as the provision of two sets of rollers, allows for object 250 to be moved in any direction along the surface of the platform 200.

Referring to FIG. 2D, in which the forward direction is the top of FIG. 2D, and the reverse direction is the bottom of FIG. 2D, obtaining different directions of movement of object 250 is explained. If roller chains 202 and 204 are moved forward at the same speed, object 250 will also move forward across platform 200 at that speed. If chain links 202 and 204 are moved reverse at the same speed, object 250 moves in the reverse direction along platform 200 at that speed. If chain links 202 are moved forward and chain links 204 are moved reverse at the same speed, object 250 will move to the left based on the sum of the components of motion provided by the roller chains and the individual rollers in adjacent chains. On the other hand, if chain links 202 are moved reverse and chain links 204 are moved forward at the same speed, object 250 will move to the right based on the sum of the components of motion provided by the roller chains and the individual rollers in adjacent chains. Object 250 may be moved in directions other than forward, reverse, right, and left by altering the speed of chain links 202 compared to chain links 204 in substantially the same fashion as described in connection with platform 100 and as shown in FIG. 2G. Also, as described above in connection with platform 100, both chain links 202, 204 do not necessarily both need to move simultaneously to result in a desired direction of movement of object 250.

For both omnidirectional platforms 100 and 200, it should be understood that the combination of the direction and speed of the belts or chains resulting in particular movement of an object situated thereon may be unique to the configuration of grooves of the belts or rollers of the chains shown. For example, the angles of the grooves (or rollers) on one or both belts (or chains) may be changed from what is shown in the illustrated embodiments. Depending on how the angle is changed, different combinations of speeds of movement of the belts (or chains) may provide the same movement of an object in engagement with the belts (or chains). For example, although in the illustrated embodiment, movement of the belts (or chains) in the opposite directions at the same speed may produce perpendicular movement of the object to the left or the right, if the grooves (or rollers) are positioned at different angles than those shown, perpendicular movement of the object to the left or the right may result from movement of the belts (or chains) in opposite directions, but also at different speeds relative to one another.

Despite the different structural components of platform 200 compared to platform 100, it should be understood that platform 200 may be used for substantially the same applications as platform 100.

Figure 3A:
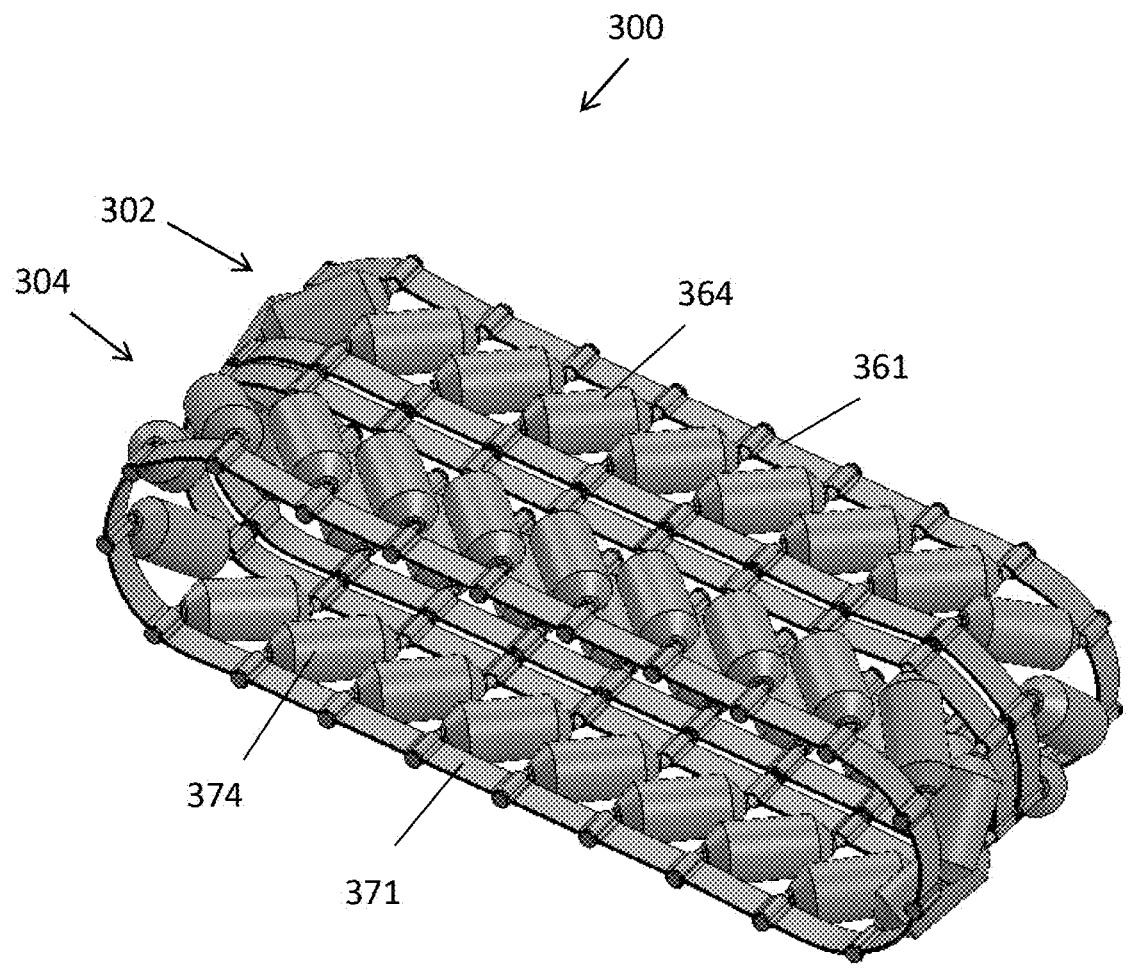
FIG. 3A is a perspective view of a pair of roller belts for use in an omnidirectional platform.
Figure 3B:
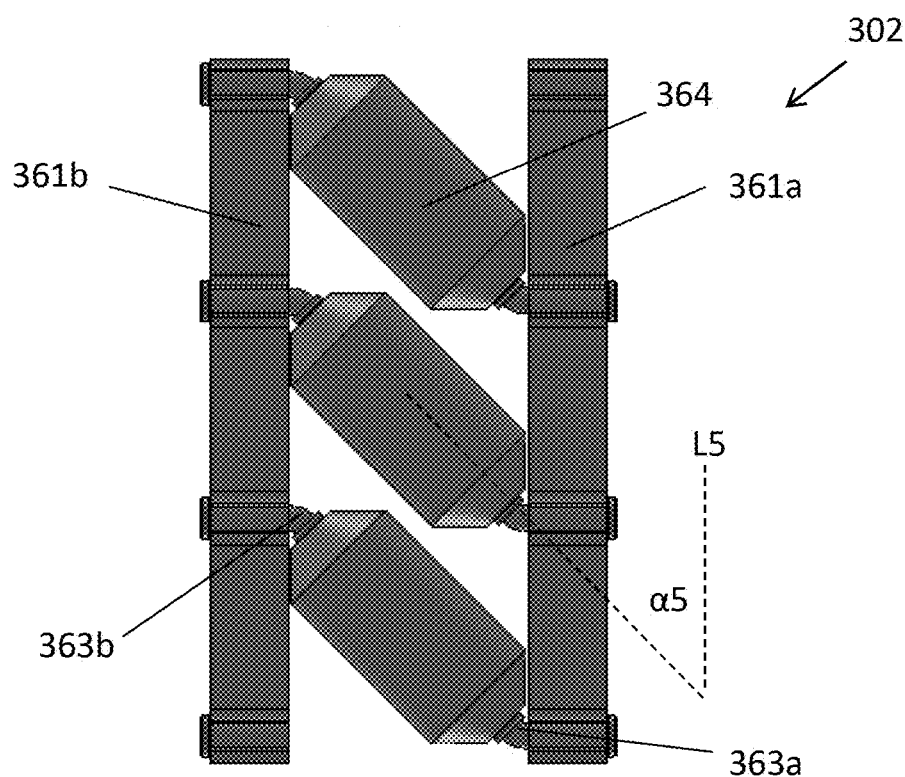
FIGS. 3B-C are top views of portions of the roller belts of FIG. 3.
Figure 3C:
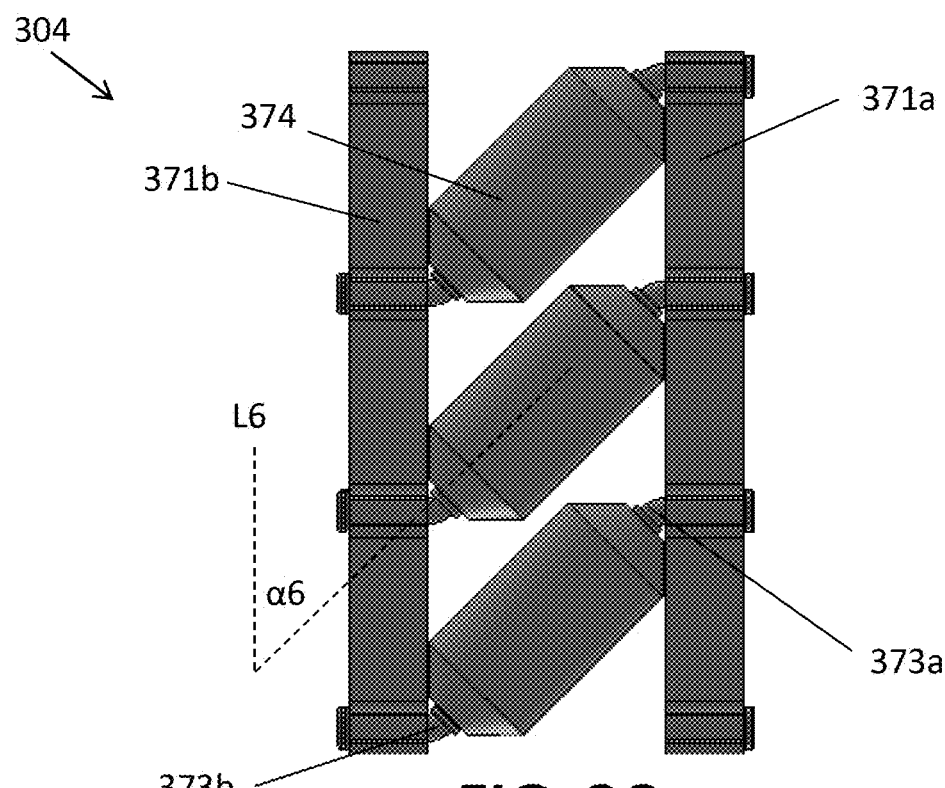

FIG. 3A illustrates a platform 300 for omnidirectional movement including roller belts 302, 304 that combine elements of platform 100 and platform 200. In particular, roller belts 302, 304 combine portions of the belt structure of belts 102, 104 with the rollers of roller chains 202, 204. Platform 300 includes a plurality of rollers belts 302, 304 in an alternating configuration in a generally similar configuration to that of platform 100 with a similar or identical driving mechanism as platform 100, with the main difference being that belts 102, 104 are replaced with roller belts 302, 304. Although platform 300 is shown as including two belts 302, 304, more than two belts may be used. A platform incorporating roller belts 302, 304 may include an equal number of roller belts 302 and roller belts 304 spaced in an alternating fashion, such as three roller belts 302 and three roller belts 304. However, as with the other embodiments above, roller belts 302, 304 need not be positioned directly adjacent to one another as long as an object on the platform is capable of simultaneously contacting one roller belt 302 and one roller belt 304. Although one specific version of a platform 300 using roller belts 302, 304 is described and illustrated, it should be understood that the alterations described above with respect to platform 100 and platform 200 may equally apply to a platform that incorporates roller belts 302, 304. Each roller belt 302, 304 may include a belt support 361, 371 respectively. Belt support 361 may include two lateral members 361a, 361b as shown in FIG. 3B. Belt support 371 may also include two lateral members 371a, 371b as shown in FIG. 3C, with a substantially mirror construction compared to lateral members 361a, 361b. Each belt support 361, 371 may form a continuous loop, the opposite ends of which may be looped around a pair of drive members similar to those described above in connection with platform 100. Preferably, the belt supports 361, 371 are flexible enough to allow for movement about a pair of rotating driver members, but sturdy enough so that a plurality of rollers 364, 374 may be supported between the lateral members 361a-b and 371a-b that form each belt support 361, 371, respectively.

Each roller 364, 374 may be similar construction to roller 264. A first end portion of roller 364 may be coupled to lateral belt member 361a by a fastener, such as a pin 363a, with a second end portion of roller 364 opposite the first end portion coupled to lateral belt member 361b by a fastener, such as a pin 363b. The pins 363a and 363b are preferably coupled to lateral members 361a, 361b so that roller 364 is capable of substantially freely rotating about its longitudinal axis. Roller 374 may be similarly coupled to lateral belt members 371a and 371b by fasteners such as pins 373a and 373b. It should be understood that although the fasteners are described as pins, any fasteners may be suitable that permit the roller to substantially freely rotate about its axis while being secure enough to support the rollers between the lateral belt members. Also, it should be understood that pins 363a and 363b need not be separate members but rather may form portions of a single pin member. The same is true for pins 373a and 373b.

As best illustrated in FIG. 3B, a plurality of rollers 364 may be positioned parallel to one another in series connected to lateral members 361a and 361b of belt support 361. Each roller belt 302 may be adapted to move in a forward or reverse direction parallel to line L5, with an axis of rotation of each roller 364 forming an angle $\alpha 5$ with respect to the direction of movement of roller belt 302. Similarly, a plurality of rollers 374 may be positioned parallel to one another in series connected to lateral members 371a and 371b of belt support 371. Each roller belt 304 may be adapted to move in a forward or reverse direction parallel to line L6, with an axis of rotation of each roller 374 forming an angle $\alpha 6$ with respect to the direction of movement of roller belt 304. Angles $\alpha 5$ and $\alpha 6$ may be substantially equal to one another, and may each be about 45 degrees. However, as described above, angles $\alpha 5$ do not necessarily need to be equal to angles $\alpha 6$, and angles $\alpha 5$ and $\alpha 6$ may each be any angle between 0 and 90 degrees. A platform incorporating three roller belts 302 and three roller belts 304 in an alternating fashion may have a similar configuration as that shown in FIG. 2D for platform 200, with the main exception that the platform uses continuous belts support rollers as opposed to platform 200, which uses individual links that are chained together. With this configuration, an object may be moved in any direction across a top surface of a platform incorporating roller belts 302, 304 in substantially the same manner as described for platform 200 and shown in FIG. 2G. One potential drawback of the roller belts 302, 304 is that, because of the configuration of the rollers 364, 374 being attached at their opposite ends to belt supports 361, 371, undesirable forces may be placed on the belt supports as the belt supports move the rollers from the top surface to the bottom surface. In other words, as best shown in FIG. 3A, as the rollers 364, 374 are in the positions at the far ends of the belt supports 361, 371 at the point at which the turn is made, relatively high stresses may be placed on the belt supports 361, 371.

Figure 3D:
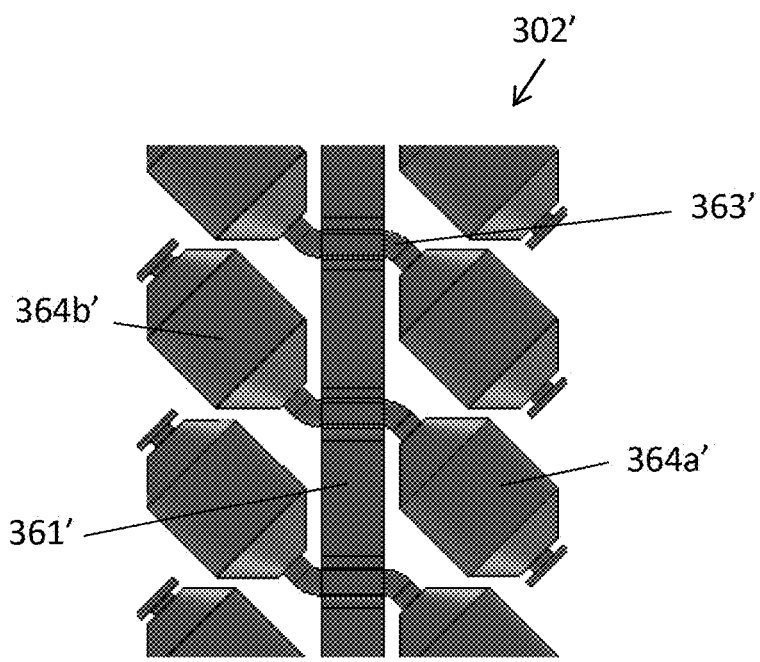
FIGS. 3D-E are top views of a portion of first and second individual roller belts for use in an omnidirectional platform.
Figure 3E:
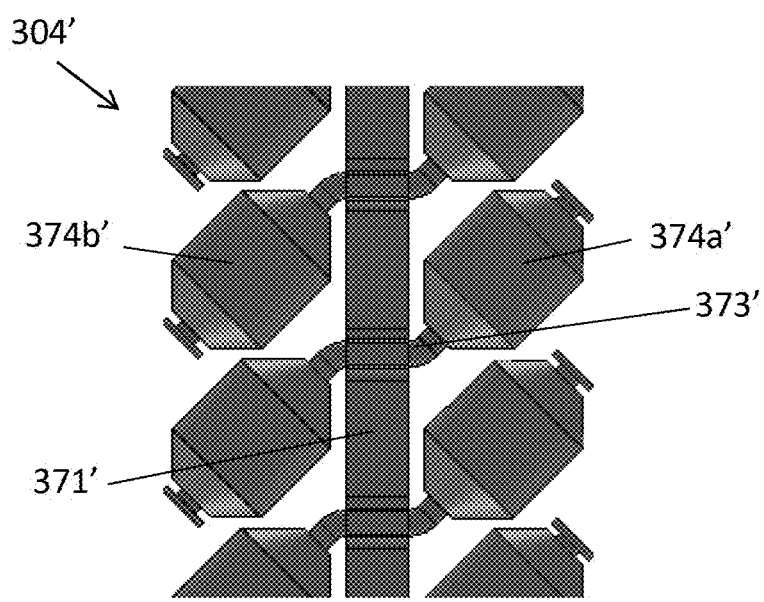

The potential issue of high stresses occurring at the point of the turn in the roller belts 302, 304 described above may be alleviated at least in part by using rollers that are effectively split and attached to a belt support at the center of the split. For example, an alternate version of the roller belts 302, 304 is shown in FIGS. 3D-E. Roller belts 302' and 304' (and a platform incorporating the roller belts 302', 304') may be similar in construction, use, and function as roller belts 302 and 304 (and a platform incorporating the roller belts 302, 304), with the exceptions noted below. Roller belts 302' and 304' may each include a belt support 361', 371', respectively. Rather than having two support belt portions that straddle a single roller, roller belts 302' and 304' are effectively the inverse with two roller portions 364a', 364b' straddling a single belt support 361' (or two roller portions 374a', 374b' straddling a single belt support 371'.). Two corresponding roller portions 364a', 364b' may be coupled to one another by a pin 363', fastener, or other support that allows each corresponding roller portion 364a', 364b' to freely rotate about the pin. The particular structure of the belt support 361', pin 363', and roller portions 364a', 364b' should be configured so the belt support 361a' and roller portions 364a', 364b' resist any significant tilting. Roller belt 304' may be substantially a mirror image of roller belt 302', with the angle of roller portions 364a', 364b' and pins 363' being substantially equal, but in the opposite direction, of the angle of roller portions 374a', 374b', and pins 373'. However, it should be understood that the different alternatives described with respect to roller belts 302, 304 may apply with equal force to roller belts 302', 304'. One benefit of the roller belts 302', 304' is that, as the support belt 361' (or 371') makes the turn from a top side to a bottom side of a platform, the stresses placed on belt support 361' (or 371') from the rollers may be less than what is encountered with roller belts 302 and 304.

As should be appreciated from the description above, some embodiments of a platform may utilize a belt configuration while other embodiments of a platform may utilize a chain configuration. The use of links forming chains may result in less loss of power as a driver causes the chains to move compared to a belt configuration. Depending on the particular form of the links, the links of a chain may also be more durable, particularly under high force applications. However, belt configurations tend to result in smoother and quieter operation compared to links that form chains. Belt configurations may also require less maintenance compared to links that form chains. However, as described below, configurations other than belt and chain configurations may be utilized to provide omnidirectional movement of an object over a surface.

Although the embodiments provided above describe platforms that provide for omnidirectional motion of an object on the platform using members having certain surface characteristics arranged as belts or chains, still other designs may be suitable for providing omnidirectional movement of an object within the scope of the disclosure. For example, rather than using continuous or endless belts or chains, members having similar surface characteristics as those described above arranged in pairs with reciprocating movement may be suitable in some embodiments.

Figure 4A:
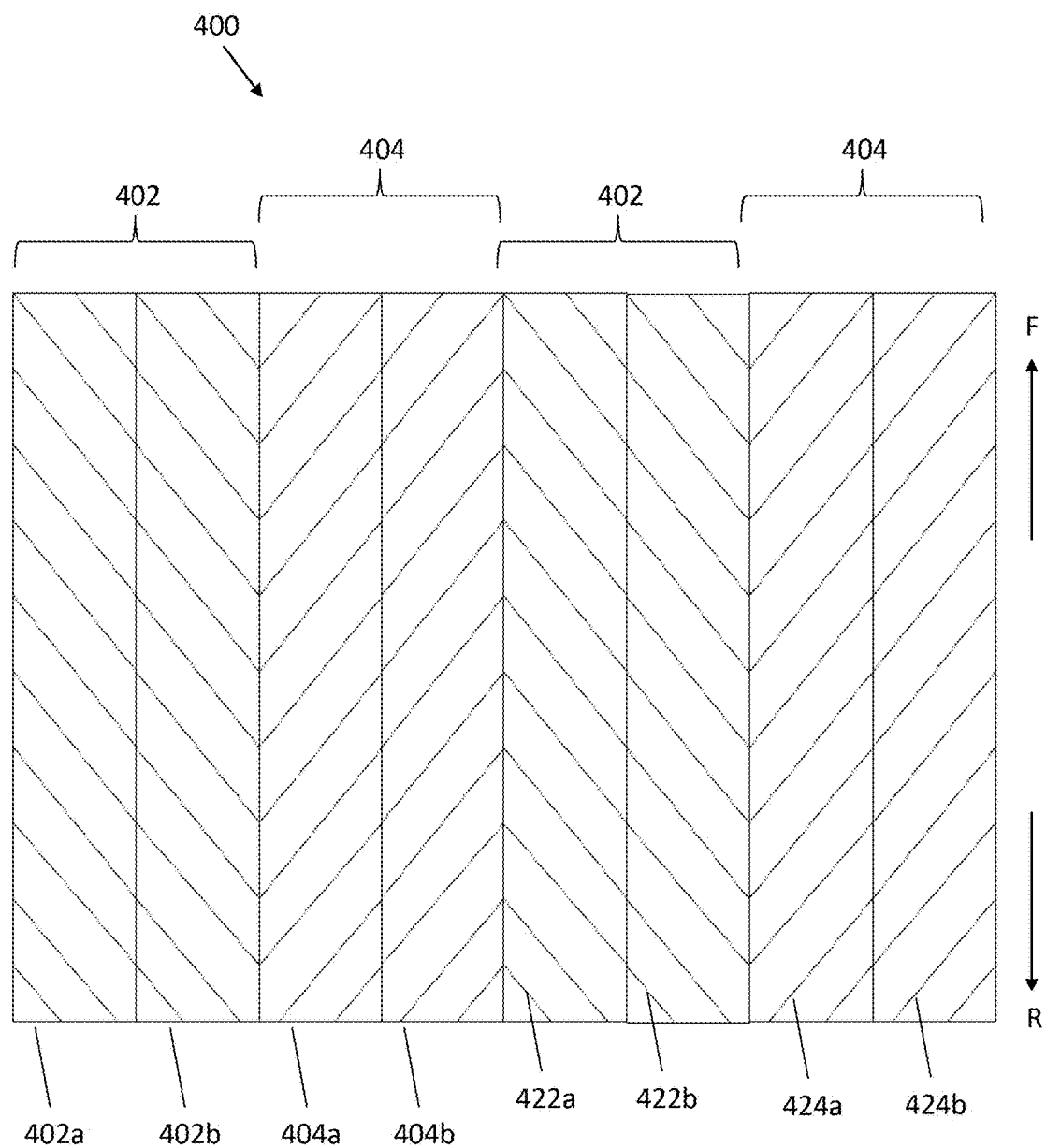
FIG. 4A is a schematic top view of a platform for omnidirectional movement according to an embodiment of the disclosure.

FIG. 4A illustrates a top view of an omnidirectional platform 400. Platform 400 may include first members 402 and second members 404, which may be provided in alternating fashion, although each first member 402 need not be positioned directly adjacent a second member 404. Each first member 402 may include a first substantially rigid member 402a and a second substantially rigid member 402b, which may be identical to one another. Each second member 404 may include a first substantially rigid member 404a and a second substantially rigid member 404b, which also may be identical to one another. In some embodiments, rigid members 402a, 402b, 404a, and/or 404b may be planks. Rather than taking the form of a continuous or endless belt or chain, each plank 402a, 402b, 404a, 404b may take the form of a substantially flat, rigid member that has a finite length. As is described in greater detail below, each member 402 and each member 404 may be connected to a support mechanism that provides for reciprocating motion of the individual planks 402a, 402b, 404a, 404b of the corresponding member 402, 404. With this configuration, one plank 402a of the member 402 may be moved in the forward or reverse direction while the top surface of the plank 402 is available to support an object, while the other plank 402b of the member 402b is positioned so that its top surface is below the top surface of plank 402a. As described in greater detail below, the reciprocating motion of the individual planks 402a, 402b of a member 402 may simulate continuous belt-like or chain-like movement while avoiding a belt or chain-like structure. It should also be understood that in the representation of platform 400 in FIG. 4A, each plank 402a, 402b (or 404a, 404b) of each member 402 (or 404) is illustrated being positioned in the same plane as one another. As will become clear from the description below, in operation planks 402a (or 404a) would generally be positioned along different planes as the other plank 402b (or 404b) of the member 402 (or 404) as one plank 402a provides a support surface while the other plank 402b returns to an initial position so it may serve as a support surface once plank 402a begins to return to its initial position.

Figure 4B:
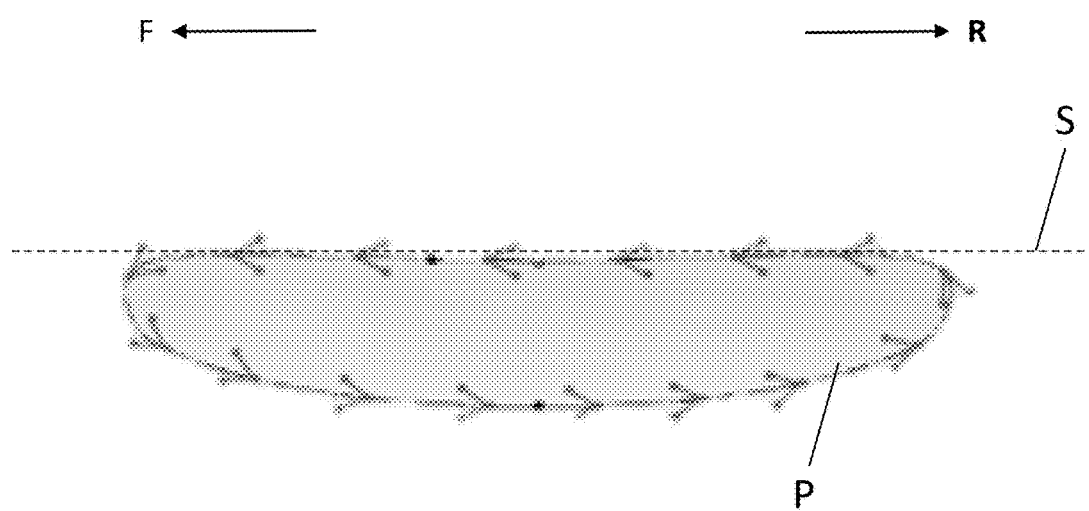
FIG. 4B is a schematic representation of a path of movement of a plank of the platform of FIG. 4A as viewed from the side.

FIG. 4B is a schematic view of the path of movement of each plank 402a, 402b, 404a, 404b as viewed from a side of the platform. Purely for purposes of illustration, the forward direction is taken as the direction F of FIG. 4A, while the reverse direction is taken as the direction R of FIG. 4A. As shown in FIG. 4B, the top surface of each plank may move in the general path P in a continuous cycle. As illustrated, each plank may begin a cycle of motion in the forward direction with a top surface of the plank at a maximum height, the imaginary surface S generally defining the surface upon which the object will be supported. In an initial position, the top surface of the plank may be aligned with surface S at the reversemost position along surface S. The plank may continue forward movement with the top surface of the plank maintaining alignment with the surface S. Once the plank reaches a forwardmost position, it may begin to move in the reverse direction R towards the initial position. However, just before, simultaneous with, or just after the plank shifts from motion in the forward direction to motion in the reverse direction, the plank is moved downward with respect to surface S so that the top surface of the plank is no longer aligned with surface S. The plank then continues its motion in the reverse direction, and the top surface of the plank is then brought back into alignment with the surface S just before, simultaneous with, or just after the plank reaches its initial position and the movement changes from reverse motion to forward motion. This cycle may continue as desired for each plank, and it should be understood that although FIG. 4B illustrates the top surface of the plank aligned with surface S only during forward motion, the plank may cycle in the opposite direction along the same pathway illustrated in FIG. 4B.

Figure 4C:
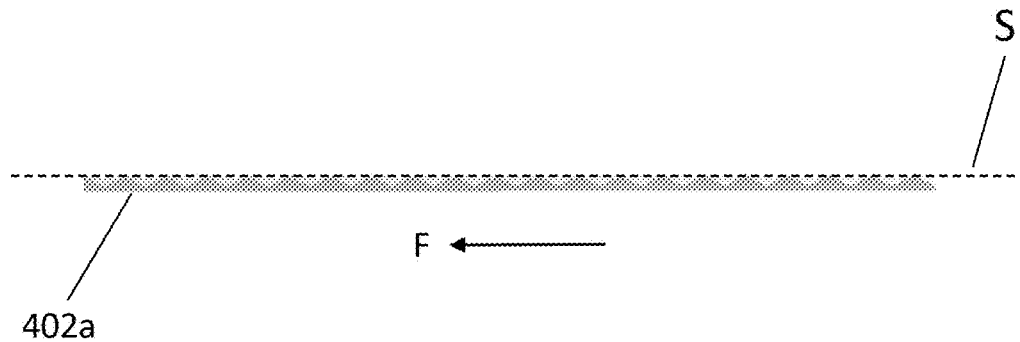
FIGS. 4Ca, 4Da, 4Ea, and 4Fa each illustrate a position of one plank of a member of the platform of FIG. 4A as it cycles through the path shown in FIG. 4B.
Figure 4C:
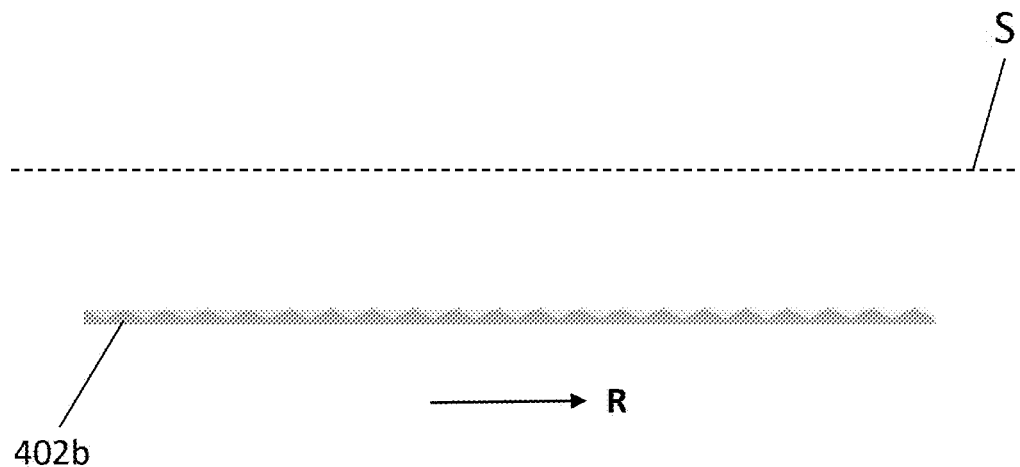
Figure 4D:
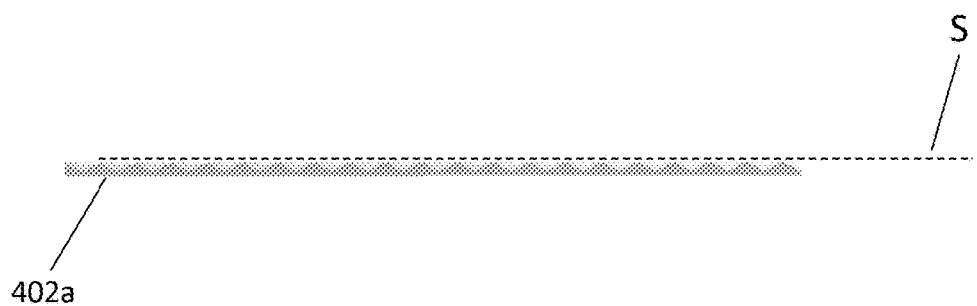
FIG. 4Ga-d illustrate a Chebyshev plantigrade machine according to the prior art producing the path of movement of FIG. 4B.
Figure 4D:
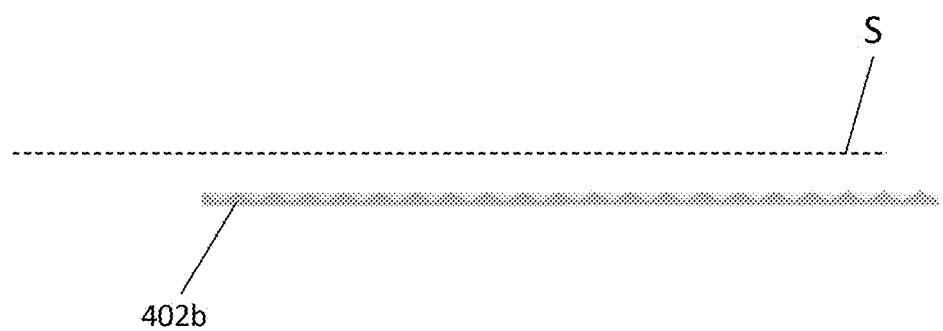

With the general pathway P of each plank 402a, 402b, 404a, 404b having been described above, the aggregate out-of-phase movement of two planks 402a, 402b of member 402 is described in FIGS. 4C-4F. It should be understood that FIGS. 4C-4F represent side views of platform 400 similar to that shown in FIG. 4B. FIGS. 4C-F having an "a" designation show the movement of plank 402a with plank 402b omitted for clarity of illustration, while FIGS. 4C-F having a "b" designation show the movement of plank 402b with plank 402a omitted for clarity of illustration. FIGS. 4Ca and 4Cb illustrate a first position of planks 402a-b, in which the top surface of plank 402a is aligned with surface S and is moving forward, while the top surface of plank 402b is below surface S and moving in reverse. In this point of the cycle, an object supported by platform 400 may at least partially be supported by plank 402a with motion of the object being driven by the combined movement of the planks (e.g. 402a and 404a) on which the object is supported. As the cycle continues, as shown in FIG. 4Da-b, as plank 402a completes its forward motion, the top surface of plank 402a is about to be brought below alignment with surface S. Simultaneously, the plank 402b is finishing its reverse motion and the top surface of plank 402b is about to be brought into alignment with surface S. Preferably, the top surface of plank 402b is brought into alignment with surface S simultaneously (or near simultaneously) with the top surface of plank 402a dropping below alignment with surface S, so that at least one plank of the member 402 is always in a position to support the object at the plane of surface S.

Figure 4E:
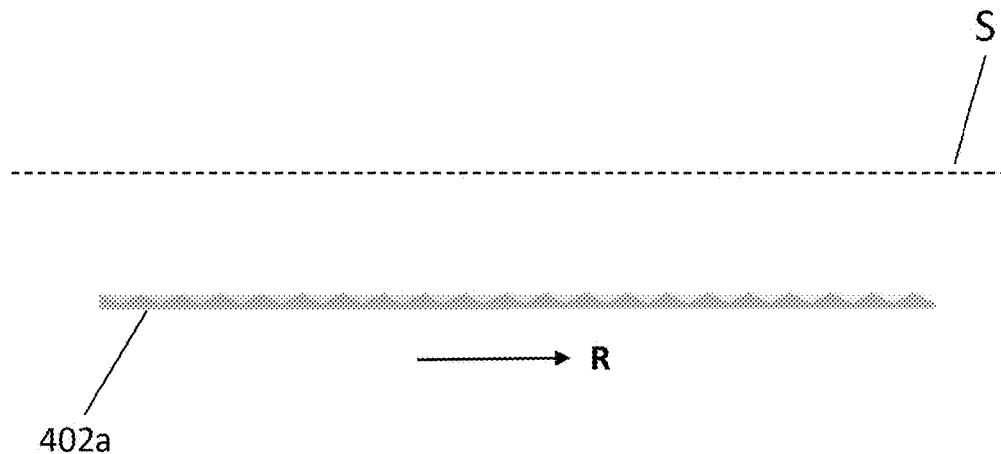
Figure 4E:
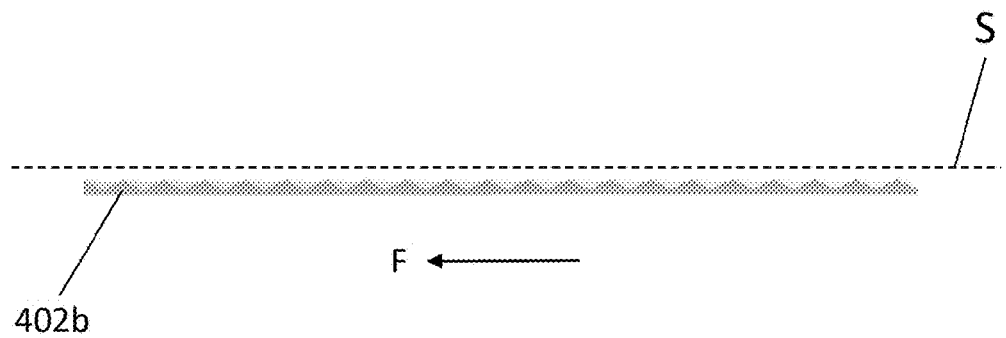
Figure 4F:
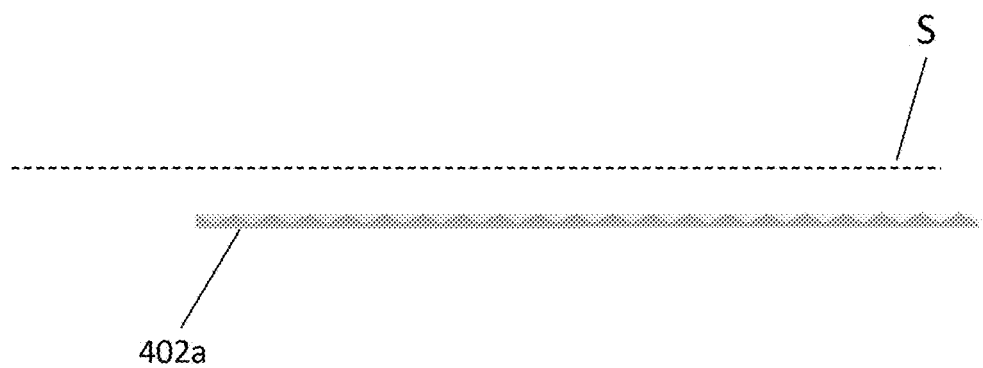
Figure 4F:
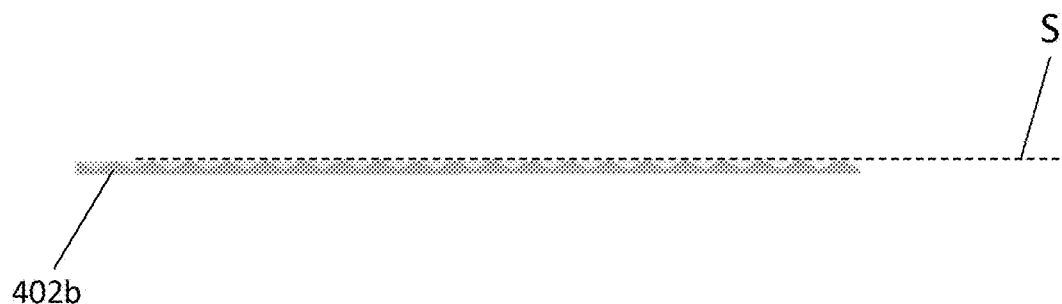

As the cycle continues in FIG. 4Ea-4Eb, plank 402b continues forward movement with its top surface aligned with surface S as plank 402a continues its movement reverse with its top surface beneath alignment with surface S. As shown in FIG. 4Fa-4Fb, the cycle concludes as plank 402a finishes its reverse movement and its top surface is about to move into alignment with surface S, and plank 402b finishes its forward movement and its top surface is about to move out of alignment with surface S. At this point, the cycle continues as shown in FIG. 4Ca-4Cb. As explained in connection with FIG. 4B, it should be understood that planks 402a and 402b may both simultaneously move along the path shown in FIG. 4B in an out-of-phase fashion, or may both simultaneously move in the opposite direction of the path shown in FIG. 4B in an out-of-phase fashion. But it is preferable that whatever path plank 402a is presently moving along, plank 402b is moving along the same path but in an out-of-phase fashion. Out-of-phase movement does not necessarily require two moving members to be out-of-phase by a particular amount, such as 90 degrees or 180 degrees, but rather refers to the situation in which two members are moving along similar paths but the positions of the two members along that path are not the same at all times. Further, although movement of member 402 is described in connection with FIGS. 4C-4F, it should be understood that member 404 may move in a similar fashion, although it should be understood that the direction and speed of movement of members 402 and 404 need not be identical.

Referring back to FIG. 4A, during operation of platform 400, the cyclic movement of plank 402a and plank 402b has the effect of mimicking continuous belt or chain movement in the forward or reverse direction, with the exception that an object supported by platform 400 is supported at any given moment by one of the planks 402a, 402b while the other plank returns to an initial position to begin another stroke. With this configuration, at least one plank 402a, 402b (or 404a, 404b) of each member 402 (or 404) is always in a position to support the object at surface S while providing the desired forward or reverse motion of the particular plank supporting the object. Still referring to FIG. 4A, each plank 402a, 402b includes surface characteristics in the form of grooves 422a, 422b that are similar or identical to those described in connection with band 102 of platform 100. Similarly, each plank 404a, 404b includes surface characteristics in the form of grooves 424a, 424b that are similar or identical to those described in connection with band 104 of platform 100. The object used with platform 400 may be similar or identical to object 150 and is preferably dimensioned with respect to the planks and members of platform 400 so that it is wide enough to be simultaneously supported by a plank 402a of member 402 and plank 404a an adjacent member 404, even while plank 402b is beneath alignment with surface S and therefore is not providing support to the object.

With the above configuration, omnidirectional movement of an object on platform 400 may be achieved in substantially the same fashion as described above with platform 100. However, platform 400 uses rigid planks which eliminates the need for continuous belts or chains, which may pose certain challenges, such as at the point that a belt or chain turns around a drive member. However, it should be understood that the surface characteristics of the planks 402a, 402b, 404a, 404b of platform 400 need not be identical to those of the bands 102, 104 of platform 100. Rather, similar to the bands 102, 104 of platform 100, the grooves of a single plank do not need to be equally spaced from one another. Further, the angles of the grooves of plank 402a do not need to be equal to the angles of the grooves of plank 404a, and may each be any angle between 0 and 90. Further, although shown as substantially straight grooves, grooves may be used that are not straight to result in the desired omnidirectional capabilities of the object. Still further, the object used with platform 400 need not be identical to object 150, but may take any of the variations described in connection with object 150 of platform 100.

It should further be understood that the use of reciprocating planks as described in connection with platform 400 need not be limited to surface characteristics that are grooves. For example, rigid planks similar to those shown in platform 400 may be used with rollers similar to those described in connection with FIG. 2D, FIGS. 3A-B, and FIGS. 3E-F being used instead of grooves. The same concepts described in connection with platform 400 would apply to such a system, with omnidirectional movement being provided by the combined movement of the rigid planks and the free rotation of the rollers positioned on the planks, rather than movement along grooves, as described in connection with rollers 264, 364, and 364a′.

Figure 4G:
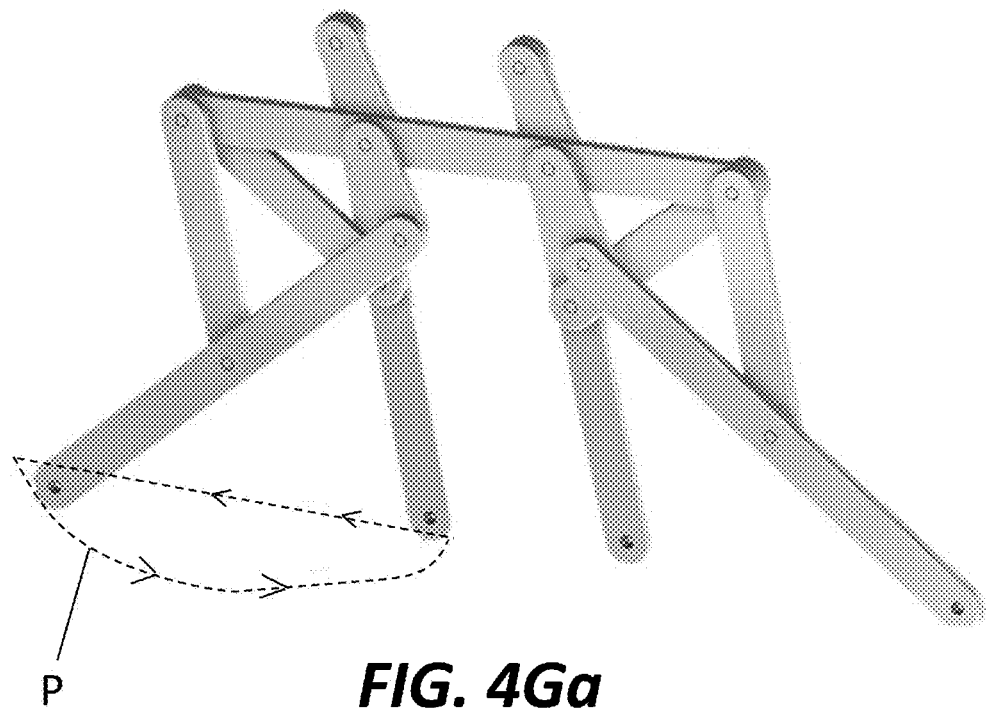
Figure 4G:
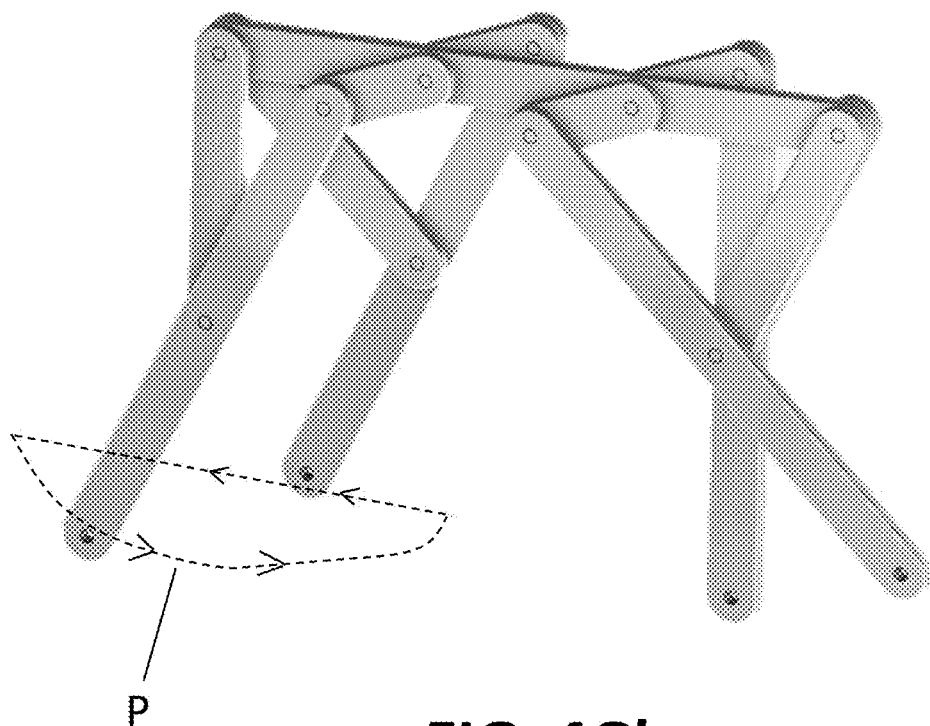
Figure 4G:
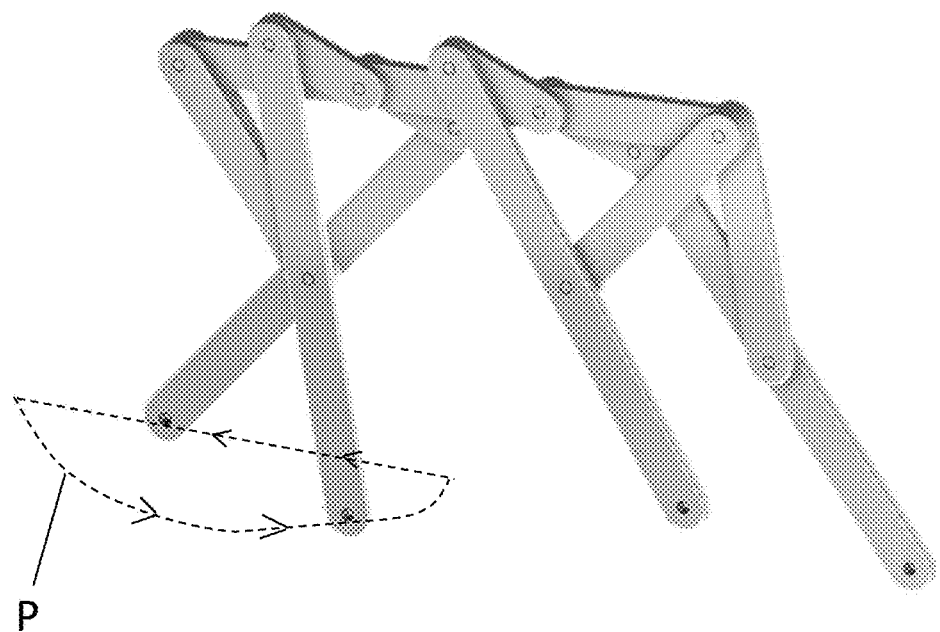
Figure 4G:
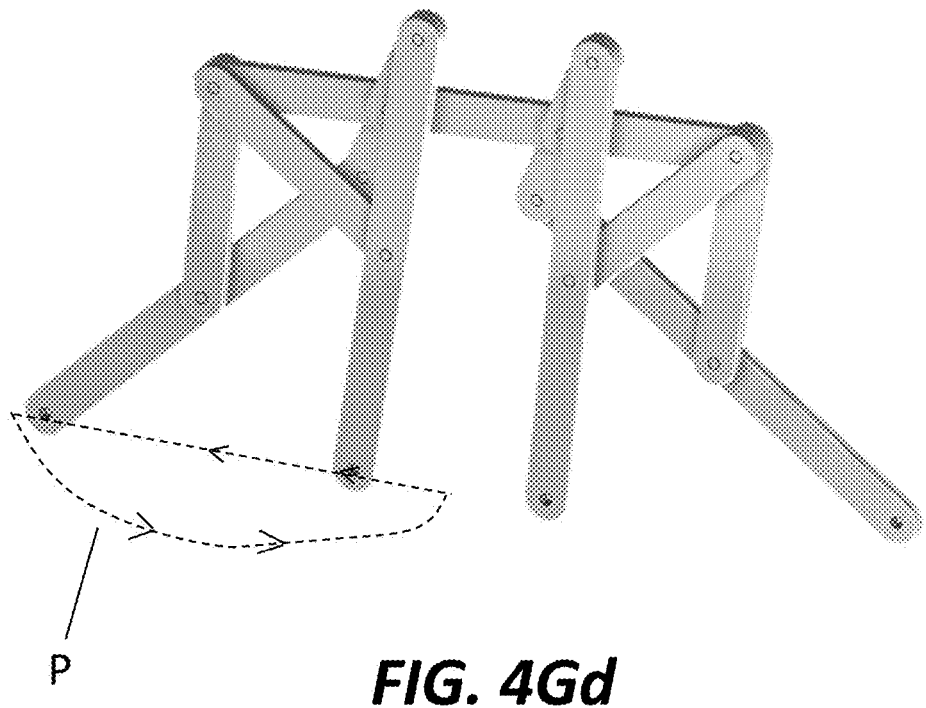

The mechanism that provides the reciprocating motion described in connection with FIGS. 4A-F may be any suitable mechanism, now known or later developed. For example, referring back to FIGS. 4A-B, the path of movement of each plank may be driven by a Chebyshev linkage or Chebyshev-type mechanism, including for example a Chebyshev plantigrade-type machine incorporating one or more Chebyshev Lambda Mechanisms. One such mechanism is shown in FIG. 4Ga-4Gd creating path P. Although not necessary, each plank 402a may be coupled to a mechanism with a single drive, while planks 402b may be coupled to a different mechanism with a single drive that is out of phase with the mechanism driving planks 402a. In some instances, plank 402a and 402b may each be driven by a single driver, while the mechanisms providing the movement of planks 402a and 402b are out of phase with one another. It should be understood that other types of mechanisms may be used other than Chebyshev linkages to produce movement identical or similar to path P. Whatever type of mechanism is used, it is preferable that as a plank moves in the forward or reverse while it is in alignment with surface S and engaged with an object, there is minimal acceleration of the plank while it remains in engagement with the object. This may help to better mimic a belt or chain moving at a constant speed, although some acceleration or deceleration caused by the path of movement of the planks, such as at or near the points at which the planks move into alignment or out of alignment with surface S, may be tolerated if such acceleration is limited.

In addition to certain alternative embodiments described above, such as the use of rollers instead of grooves, the particular number and grouping of planks of members may be altered as desired. For example, although four total members 402, 404 are shown, as few as two total members 402, 404 may be used, or as many members as desired may be used depending on the desired width of platform 400. Further, although each member 402, 404 is shown as including two planks 402a, 402b, it should be understood that more than two planks may be used for each member, as long as a surface is always or nearly always supplied to support an object moving along substantially a single plane as the platform operates.

Figure 5A:
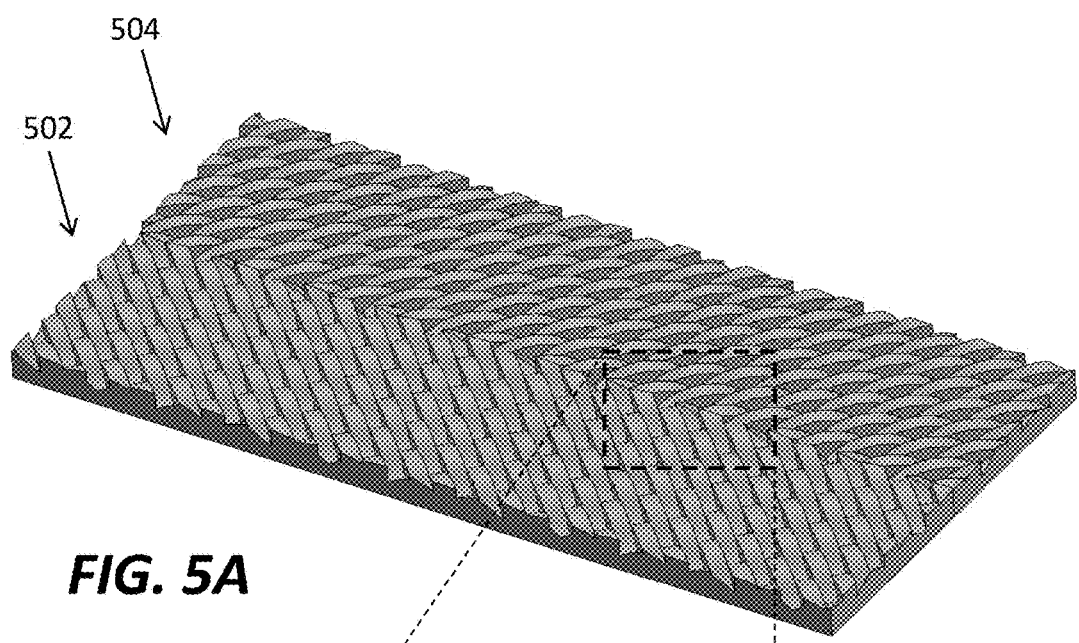
FIG. 5A is a perspective view of a pair of members for use in an omnidirectional platform.
Figure 5B:
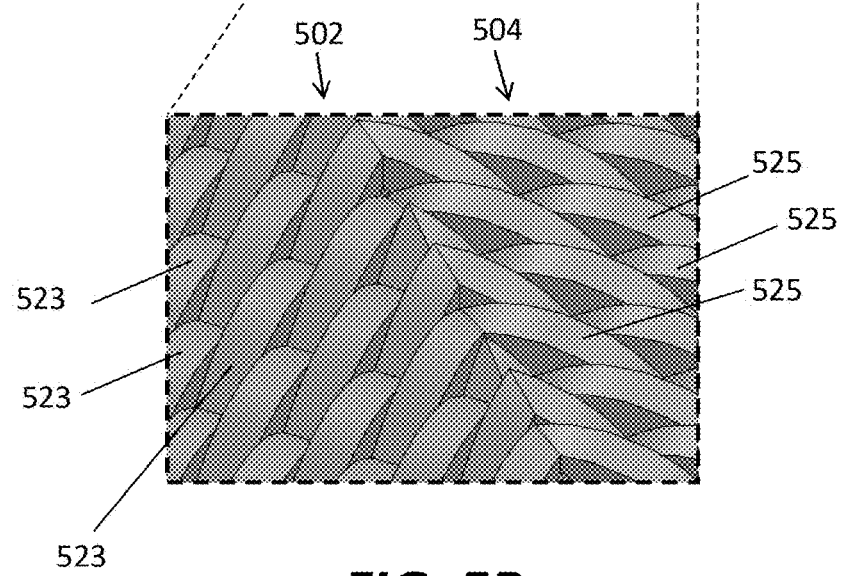
FIG. 5B is an enlarged view of a portion of the surface of the members of FIG. 5A.

FIG. 5A illustrates a perspective view of members 502, 504 that may be used in an omnidirectional platform for movement of an object similar to the other platforms described above. It should be understood that the surface characteristics of members 502, 504, and movement of the members 502, 504 provide for the omnidirectional movement of an object. In other words, the surface characteristics of members 502, 504 may be used as continuous belts, as individual platforms that are chained together to form a substantially continuous surface, or plank-type members similar to those used in platform 400 with appropriate drive mechanisms. It should be understood that member 502 is preferably independently moveable with respect to member 504, and although two members 502, 504, are shown, more members may be provided to create a platform. FIG. 5B illustrates an enlarged view of portions of members 502, 504 to more clearly illustrate the surface characteristics. Member 502 includes a plurality of series 522 of individual protrusions 523. Similarly, member 504 includes a plurality of series 524 of individual protrusions 525. Each individual protrusion 523, 525 may have a top surface extending from a first end to a second end. The first and second ends of each individual protrusion 523, 525 may both be positioned at a low point with a center portion between the first and second ends having a high point or a peak, such that the top surface has a substantially convex curvature. The top surface of each individual protrusion 523, 525 may extend in a direction that is oblique with respect to the forward F and reverse R directions of movement of members 502, 504 (see FIG. 5C). Each individual protrusion 532, 525 may also have two side surfaces that extend downward from the top surface. Although the side surfaces are shown as substantially parallel to one another, the side surfaces may slope toward or away from one another.

Figure 5C:
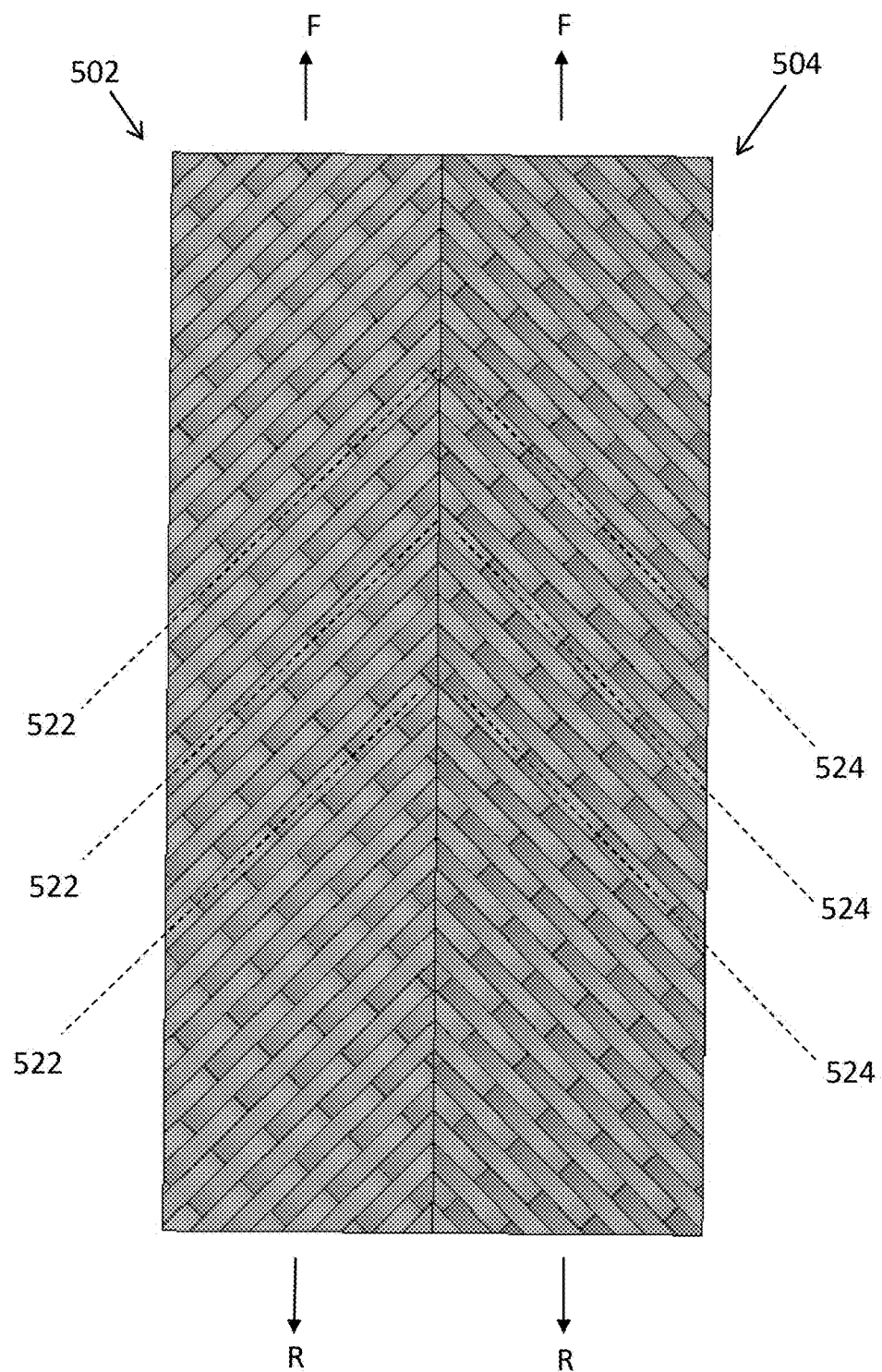
FIG. 5C is a top view of the members of FIG. 5A.

Referring to FIG. 5C, a top view of members 502, 504 is shown. Each individual protrusion 523 of a series 522 may be positioned in an end to end relation, such that the second end of the top surface of one protrusion is adjacent or connects to the first end of the top surface of an adjacent protrusion 523 in the series 522. With this configuration, each series 522 of protrusions 523 contains a plurality of peaks near the center of each individual protrusion and a series of troughs where one individual protrusion 523 meets the next individual protrusion 523 in the series 522, the peaks alternating with the troughs. Each series 522 may extend at an oblique angle to the forward F and reverse R directions of movement of member 502. Each series 524 of individual protrusions 525 on member 504 may have substantially the same configuration as that described for the series 522 of protrusions 523 of member 502. However, the series 524 may extend at an equal but opposite angle to the forward F and reverse R directions compared to the series 522. It should be understood that, like the grooves described for platform 100, the angles of series 522 do not need to be equal the angle at which series 525 extend in relation to the forward F and reverse R directions of movement, as long as the angles are not parallel or perpendicular to the forward F and reverse R directions of movement of members 502, 504.

As best seen in FIG. 5B, the peak of an individual protrusion 523 in one series 522 is preferably offset from the peak of an individual protrusion 523 in an adjacent series 522 so that at least some amount of the side surface of the individual protrusions 523 is exposed. In the illustrated embodiment, the peak of a protrusion 523 in one series 522 is positioned at the trough formed by two adjacent protrusions 523 in an adjacent series 522 to expose a maximum surface area of side walls, although this exact relationship is not required. The same is true for individual protrusions 525 in series 524. In other words, one goal of the positioning of the protrusions 523 of member 502 and protrusions 525 of member 504 is to help ensure that as an object supported by the protrusions moves in relation to the protrusions, a surface, which may be a side wall, edge, or other surface of the protrusion, is available to make contact with the object to guide the object in a desired lateral direction. Although the term side wall or side surface is used herein, it should be understood that such a surface does not need to meet any strict definition of "side" wall. For example, any surface that is presentable to help impart lateral motion to the object may be considered a "side" wall.

With the configuration described above, an object supported by members 502 and 504 may be moved in any direction in two dimensions along the surface of members 502 and 504 by moving one or both of the members 502, 504 in the forward or reverse direction at particular relative speeds. For example, if an object is supported by members 502, 504, and both members both move either forward or in reverse at the same speed, the object will move in the direction of movement of members 502, 504. However, if members 502 and 504 move in opposite directions, or there is otherwise relative movement between members 502 and 504, the object will have a component of motion transverse to the forward F and reverse R directions. The transverse component of motion of the object may be provided, at least in part, by interaction of the object with the exposed side walls (including, e.g., edges or other exposed surfaces) of individual protrusions 523 and/or 525 while there is relative movement between members 502, 504. Conceptually, this is similar to the movement of object 150 along platform 100 by interaction of the object 150 with grooves 122, 124 of platform 100, although the particular mechanism is different. The object supported by members 502, 504 may be able to contact the side walls of the protrusions 523, 525 by one or more of a variety of mechanisms. For example, if a surface of the object, such as a bottom surface, is flat and smooth, edges of the object may still be able to contact sidewalls of protrusions 523, 525, particularly if the protrusions have sufficient elasticity such that the object at least slightly depresses the protrusions 523, 525 supporting the object, leading to the edges of the object contacting sidewalls of protrusions 523, 525 adjacent to the protrusions 523, 525 supporting the object. In other examples, a surface of the object may be provided with any number of suitable features that extend from the surface of the object to create contact with the sidewalls of protrusions 523, 525. Such surface features may include texturization, such as ribs or grooves, or may include more pronounced features similar to the protrusions 152 of object 150. One of the benefits of the surface features of members 502, 504 is that the particular orientation of the object relative to the surface features of members 502, 504 may be of little or no consequence to the effective movement of the object in any desired direction along the surface of members 502, 504. It should be understood that any surface of the object that falls below the high point or peaks of the protrusions may interact with the protrusions to allow lateral motion to be imparted to the object. Still in other examples, the object itself may have an amount of elasticity such that the mass of the object results in at least some portion of the object extending below the peaks of the protrusions supporting the object, resulting in the ability of the object to contact the side walls of the protrusions to guide lateral motion of the object. This configuration could result from, for example, a rubber sole of a shoe, although materials other than rubber may provide suitable elasticity or deformability. In some examples, it may be preferable to provide a coating or other treatment to such a material, such as a rubber shoe sole, to provide for low friction in addition to high elasticity.

Referring again to FIGS. 5B-C, one example of transverse motion of an object is described. In this example, an object is supported by both members 502 and 504, and the object has a texturize bottom surface so that the object is capable of being supported by the peaks of protrusions 523, 525 while also contacting side walls of the protrusions during relative movement of the members 502, 504. If member 502 is driven in the forward direction F, and member 504 is driven in the reverse direction R at equal speeds, the interaction of a surface of the object with the differently angled sidewalls of protrusions 523 and 525 will cause lateral motion of the object with respect to the forward F and reverse R directions. However, it should be understood that the above example is based on one particular example and different angles of series 522, 524, different constructions of protrusions 523, 525, and different relative speeds of the members 502, 504 may result in different trajectories of an object supported by the members 502, 504.

Figure 5D:
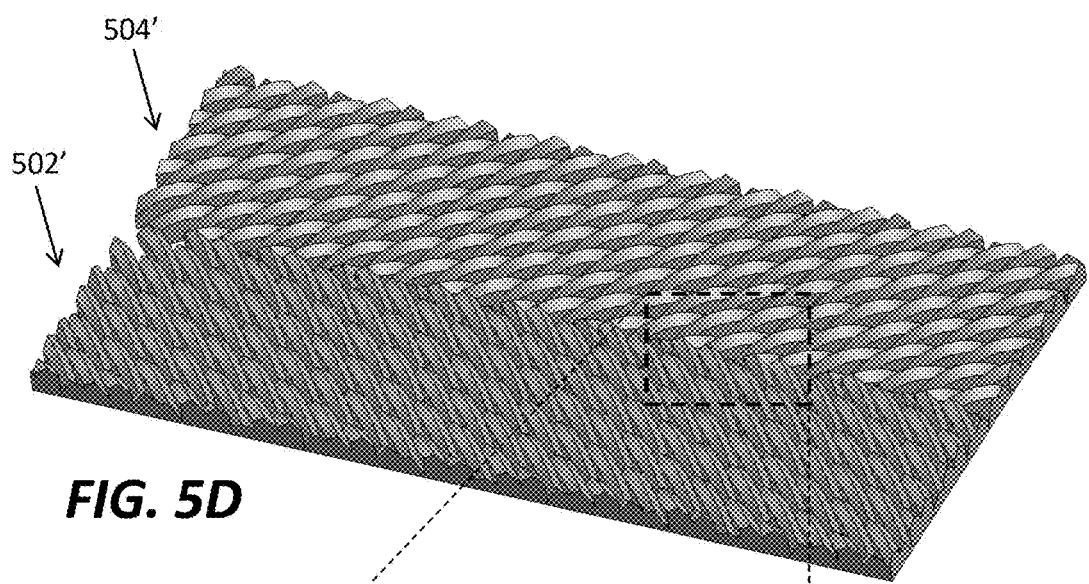
FIG. 5D is a perspective view of an alternate embodiment of the pair of members of FIG. 5A.
Figure 5E:
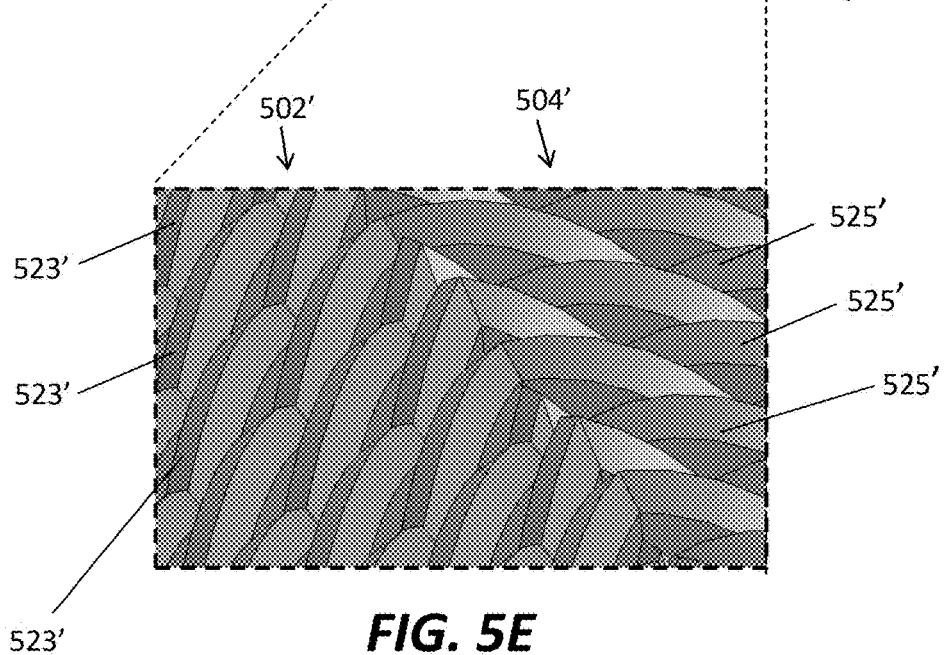
FIG. 5E is an enlarged view of a portion of the surface of the members of FIG. 5D.
Figure 5F:
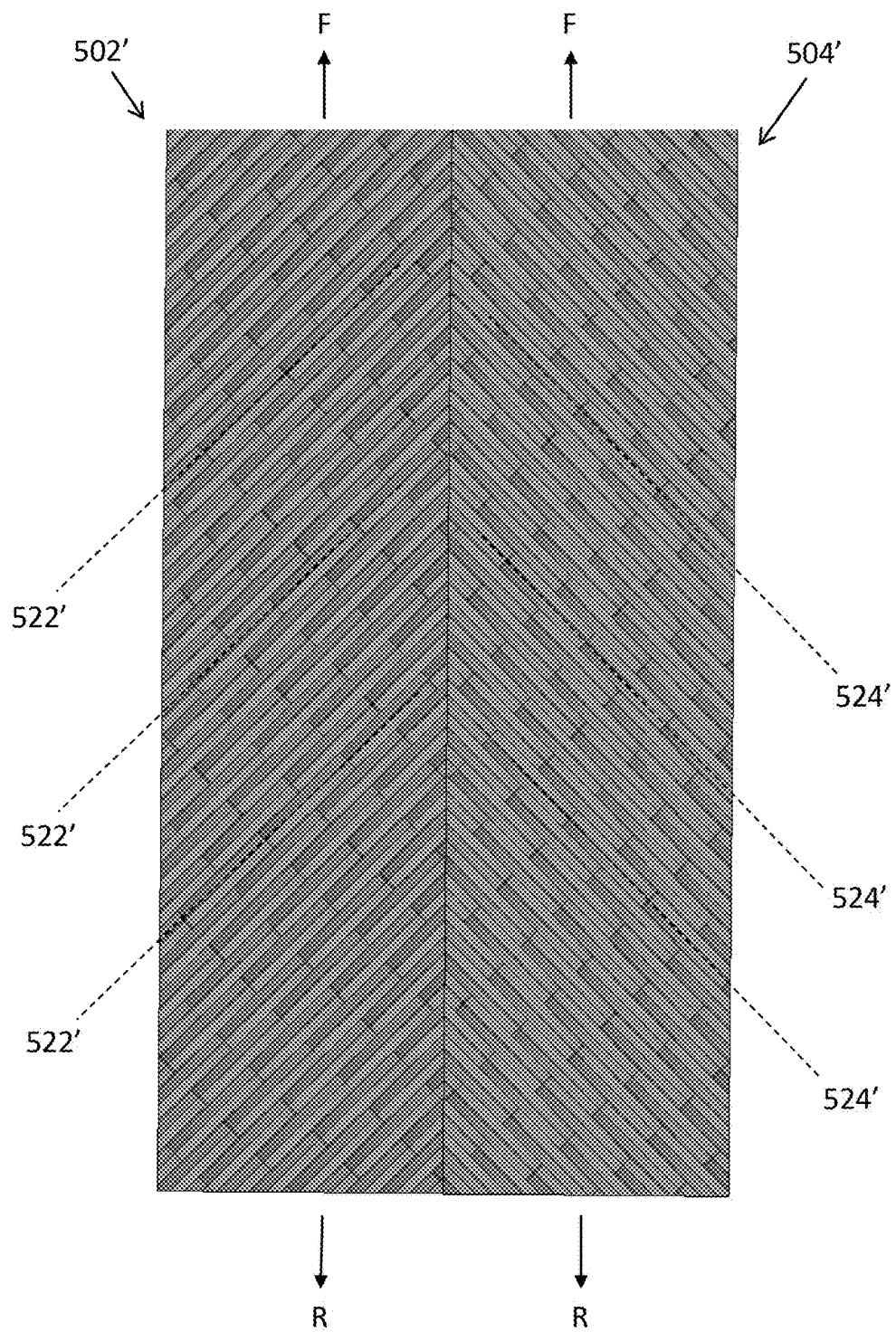
FIG. 5F is a top view of the members of FIG. 5D.

FIGS. 5D-F illustrate another embodiment of members 502 and 504. In this embodiment, members 502' and 504' may have the same features and function of members 502 and 504, with one exception. The individual protrusions 523' of series 522' and the individual protrusions 525' of series 524' have a modified top surface compared to that of protrusions 523 and 525. In particular, the top surface of protrusions 523 and 525 is convex in the direction from the first end to the second end (i.e. a length direction), but substantially flat in the direction between the two sidewalls (i.e. a width direction). The top surface of protrusions 523' and 525' are similarly convex in the length direction from the first end to the second end. However, the top surface is angled to form a peak at the center of the width of the top surface, with the top surface sloping downward from the peak to meet each sidewall, as best seen in FIG. 5E. An object supported on members 502' and 504' is still supported by the peaks of each individual protrusion 523', 525' on which the object rests. However, rather than presenting a substantially orthogonal sidewall for the object to contact to provide forces transverse the forward F and reverse R direction as in protrusions 523 and 525, transverse force may be provided on the object by either the sidewalls or the angled portions of the top surface of protrusions 523' and 525'. This additional surface area may provide for smoother transverse movement of the object. It should be understood that the variations and functions described above with respect to members 502, 504 otherwise apply equally to members 502', 504'.

FIGS. 6A-D show views of members 602, 604 that may be used in an omnidirectional platform for movement of an object similar to the other platforms described above. It should be understood that the surface characteristics of members 602, 604, and movement of the members 602, 604 provide for the omnidirectional movement of an object supported thereon. In other words, the surface characteristics of members 602, 604 may be used as continuous belts, as individual platforms that are chained together to form a substantially continuous surface, or plank-type members similar to those used in platform 400 with appropriate drive mechanisms. It should be understood that member 602 is preferably independently moveable with respect to member 604, and although two members 602, 604 are shown, more members may be provided to create a platform.

Figure 6A:
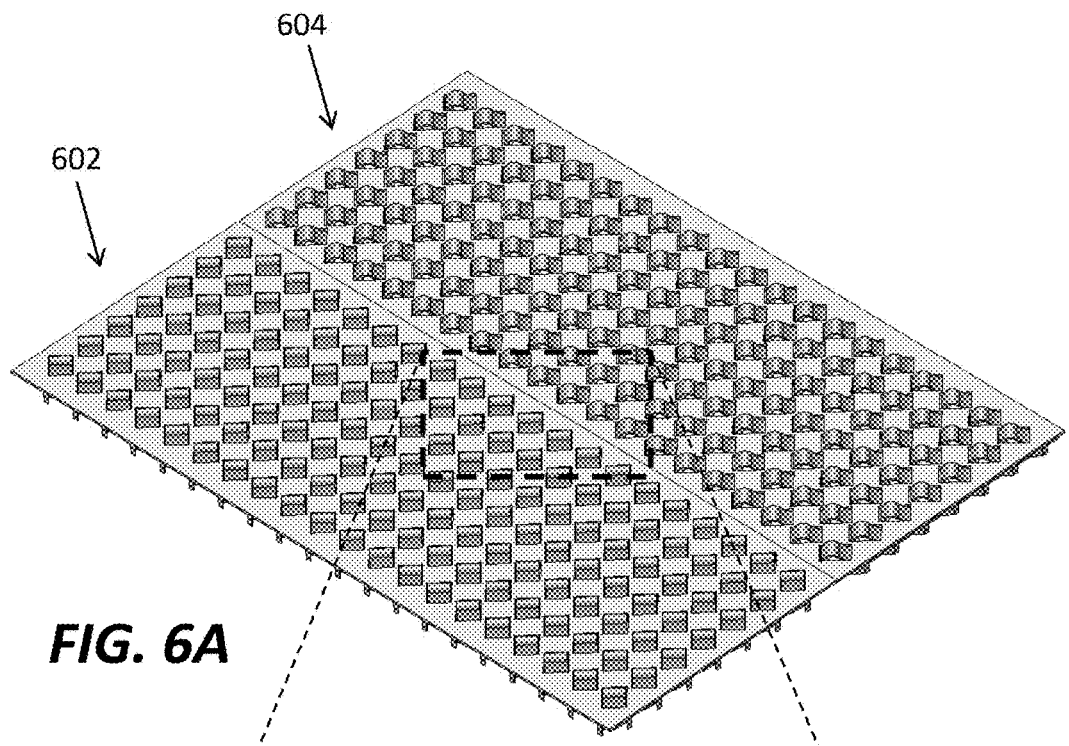
FIG. 6A is a perspective view of a pair of members for use in an omnidirectional platform.
Figure 6B:
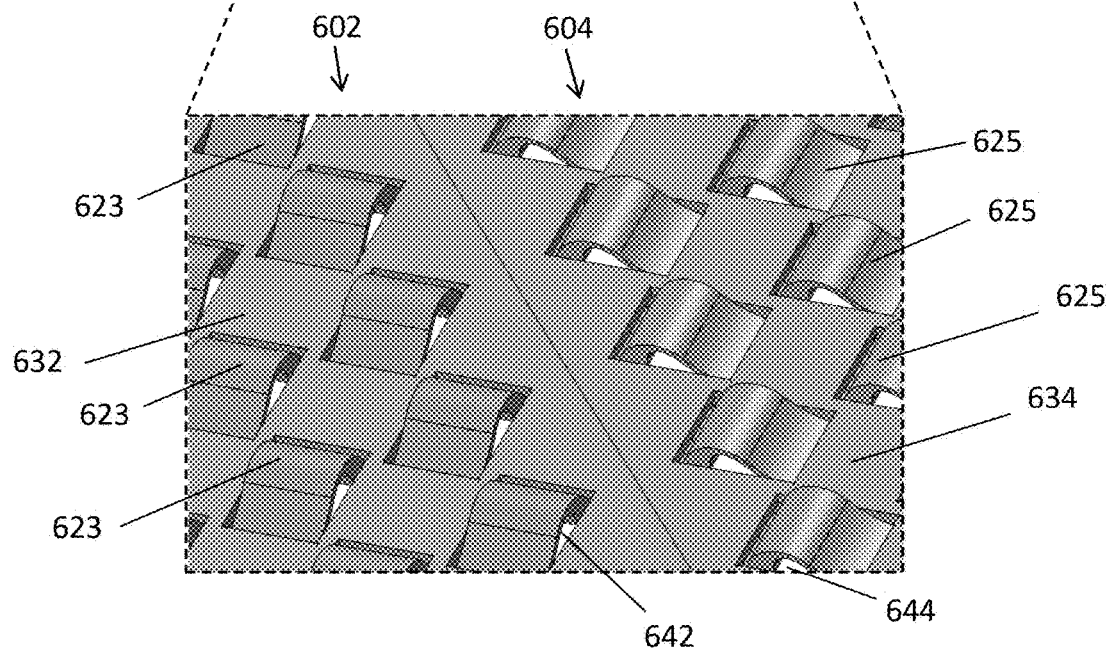
FIG. 6B is an enlarged view of a portion of the surface of the members of FIG. 6A.
Figure 6C:
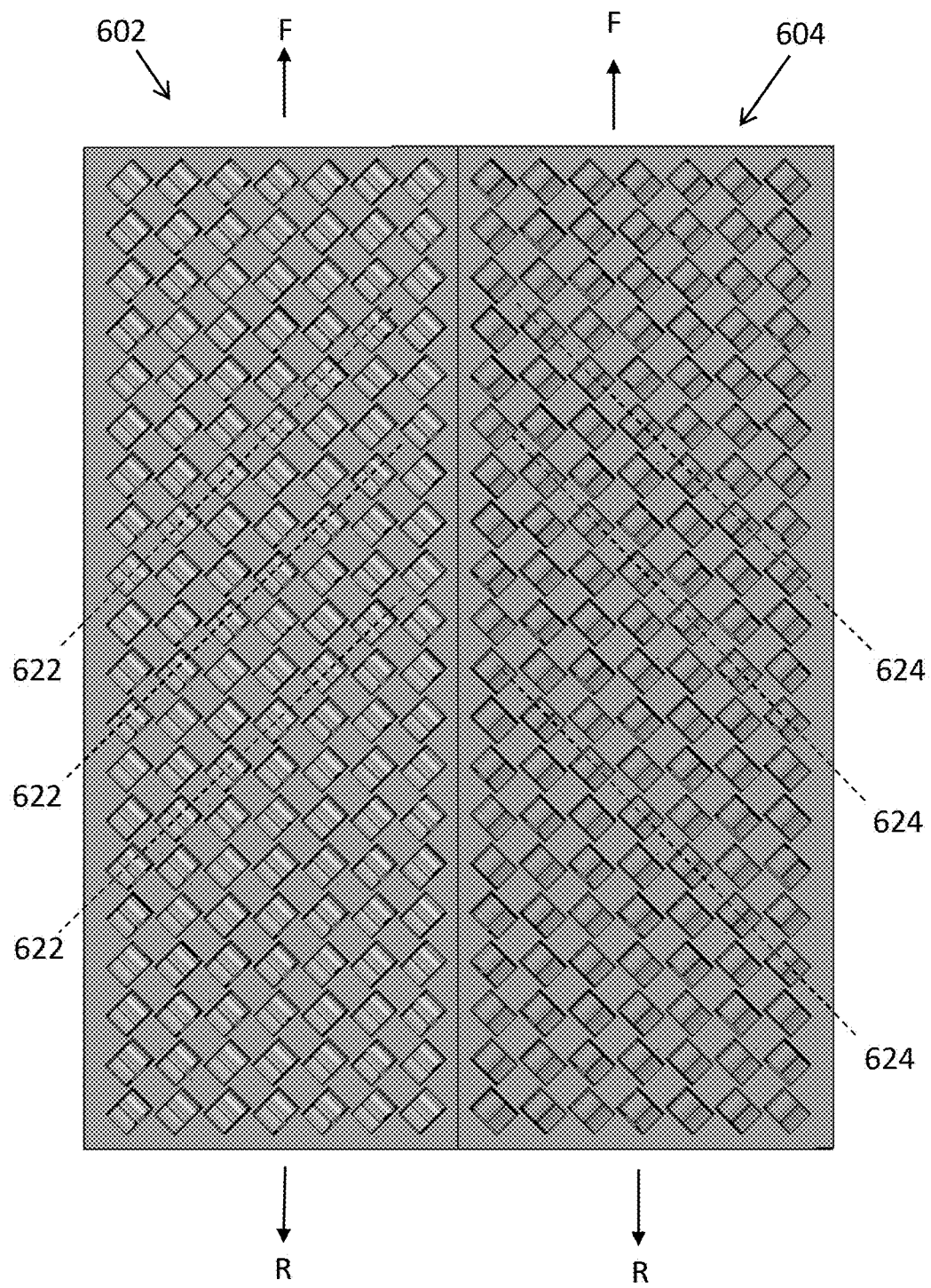
FIG. 6C is a top view of the members of FIG. 6A.

FIG. 6B illustrates an enlarged view of portions of members 602, 604 to more clearly illustrate the surface characteristics. Member 602 may include a surface 632 with a plurality of holes or openings 642 therethrough, while member 604 may similarly include a surface 634 with a plurality of holes or openings 644 therethrough. Referring briefly to FIG. 6C, the openings 642 of member 602 are aligned in a plurality of series 622, and the openings 644 of member 604 are aligned in a plurality of series 624 similar to the corresponding series in the embodiments of FIGS. 5A-F. Each opening 642 may include an individual protrusion 623 extending through the opening 642 and above the top surface 632. Similarly, each opening 644 may include an individual protrusion 625 extending through the opening 644 and above the top surface 634. Each protrusion 623, 625 may be a relatively thin strip of material that has a substantially convex top surface in the direction from a first end to a second end along the direction of the respective series 622, 624. Unlike the protrusions described above, however, each protrusion 623, 625 is preferably capable of being significantly depressed when a load is applied to the respective top surfaces, so that the protrusion is pushed partially or completely into or through the respective opening 642, 644. The protrusions 623, 625 are each preferably biased so that, in the absence of an applied force, the protrusions 623, 625 protrude through their respective openings 642, 644 and present side surfaces that are substantially aligned with side surfaces of other protrusions 623, 625 in the same series 622, 624. Although FIG. 6C shows that the series 622, 624 are each aligned at oblique angles with respect to the forward F and reverse R directions that are substantially equal one another, this does not need to be the case, as any oblique angle may be sufficient to provide omnidirectional movement of an object supported by members 602, 604.

Figure 6D:
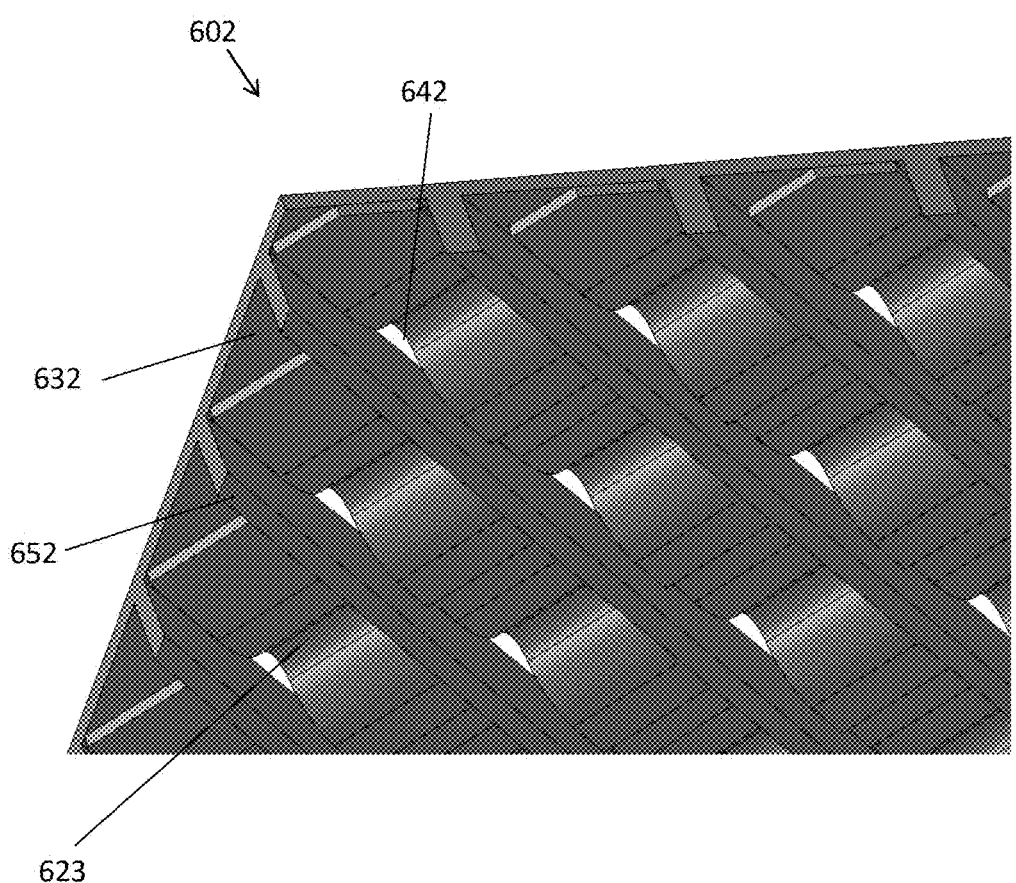
FIG. 6D is an enlarged bottom perspective view of one of the members of FIG. 6A.
Figure 6E:
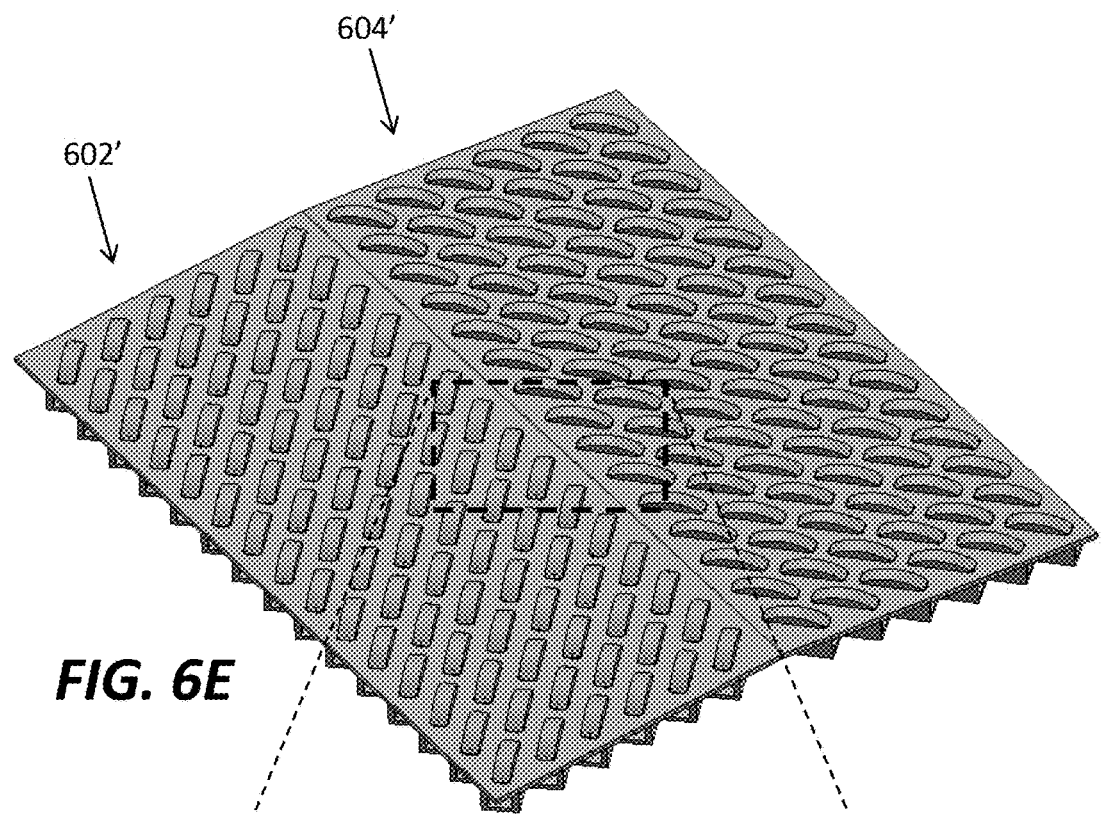
FIG. 6E is a perspective view of a pair of members for use in an omnidirectional platform according to another aspect of the disclosure.

FIG. 6D illustrates a bottom view of a portion of member 602. In the embodiment shown, each protrusion 623 is situated between two ribs 652 that extend along series 622. Ribs 652 may help ensure that, of an object is supported by a number of protrusions 623 that are depressed partially or completely through respective openings 642, there is clearance (provided by ribs 652) for such depressive movement of the protrusions 623. In other words, if the bottom side of surface 632 were in direct contact with a rigid surface, the protrusions 623 may not be able to depress to a significant degree upon an application of downward force.

Referring back to FIG. 6B, if an object is supported by a group of protrusions 623, 625, the object may depress each supporting protrusion 623, 625, with the protrusions not supporting the object remaining in the fully extended position. The flexibility of each protrusion 623, 625—or the ability to be depressed—may depend on the material forming protrusions 623, 625, as well as the particular geometry of the protrusions 623, 625 (e.g. how thin each protrusion is or the specific curvature). The protrusions 623, 625 may be designed to have a desired flexibility or spring force based upon the desired application (e.g. the mass of a typical object expected to be supported by members 602, 604). Similar to embodiments described above, if members 602, 604 both move in the forward direction simultaneously at the same speed, or in the reverse direction simultaneously at the same speed, the object supported by members 602, 604 will move in the corresponding direction. However, if there is relative movement between the members 602, 604, the object supported by the members will have a component of movement transverse the forward F and reverse R directions. Because the protrusions 623, 625 supporting the object will be depressed by the object, the remaining protrusions 623, 625 will be in the fully extended positions with the side surfaces of those protrusions available for contacting the object as it moves with respect to members 602, 604. The side surfaces of protrusions 623, 625 in the fully extended position will provide a force component based in part on the angle of the protrusions and the speed (or relative speed) of members 602, 604. The result is similar as described in the embodiments above, although the object may tend to be better "locked in" to a particular desired path of movement because of the large surface presented to the object.

Even though protrusions 623, 625 are described as "individual" protrusions, each protrusion in a series may be formed as a single integral element. It may also be possible to design the entire set of protrusions 623 of member 602 (or protrusions 625 of member 604) as a single integral element, which may ease manufacturing. However, this is not required. Similarly, although one particular embodiment of a depressible protrusion 623, 625 is shown, other depressible protrusions may be suitable. For example, any object that provides an angled side surface that is capable of being depressed and is biased to an extended position, for example by springs or similar mechanisms, may be suitable for use in members 602, 604. Still further, ribs 652 (and corresponding ribs on member 604), may not be necessary, as long as protrusions 623, 625 are capable of being depressed to the desired degree.

FIGS. 6E-H show views of members 602', 604' that are similar in function to members 602, 604, and that may be used in an omnidirectional platform for movement of an object similar to the other platforms described above. It should be understood that the surface characteristics of members 602', 604', and movement of the members 602', 604' provide for the omnidirectional movement of an object supported thereon. In other words, the surface characteristics of members 602', 604' may be used as continuous belts, as individual platforms that are chained together to form a substantially continuous surface, or plank-type members similar to those used in platform 400 with appropriate drive mechanisms. It should be understood that member 602' is preferably independently moveable with respect to member 604', and although two members 602', 604', are shown, more members may be provided to create a platform.

Figure 6F:
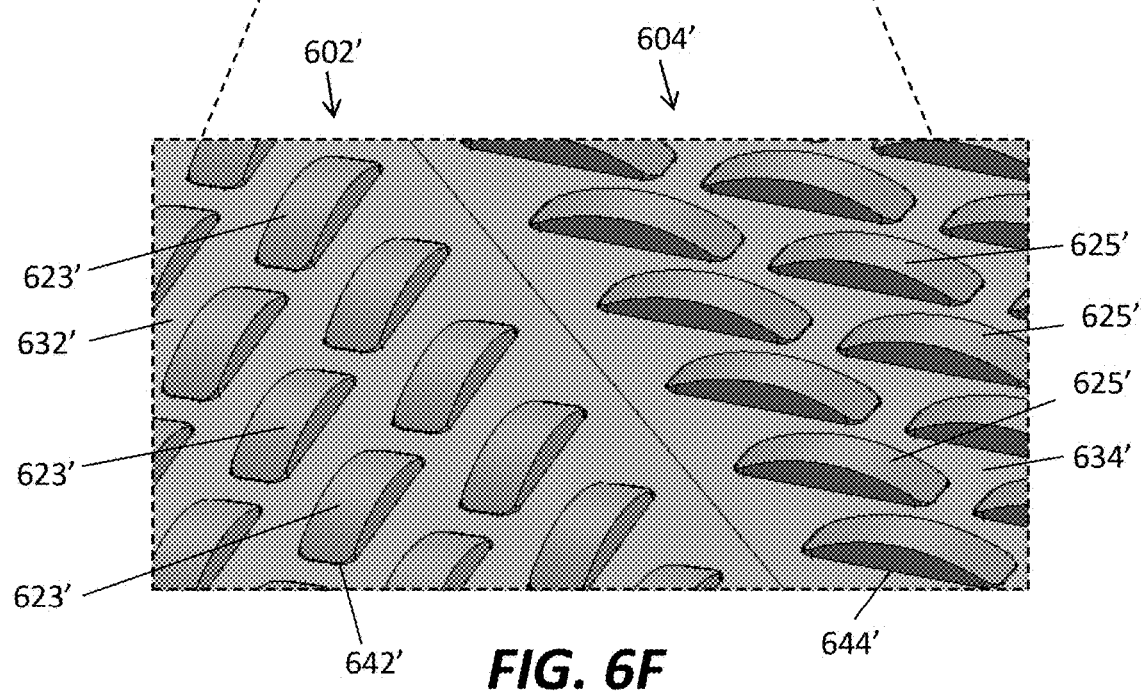
FIG. 6F is an enlarged view of a portion of the surface of the members of FIG. 6E.
Figure 6G:
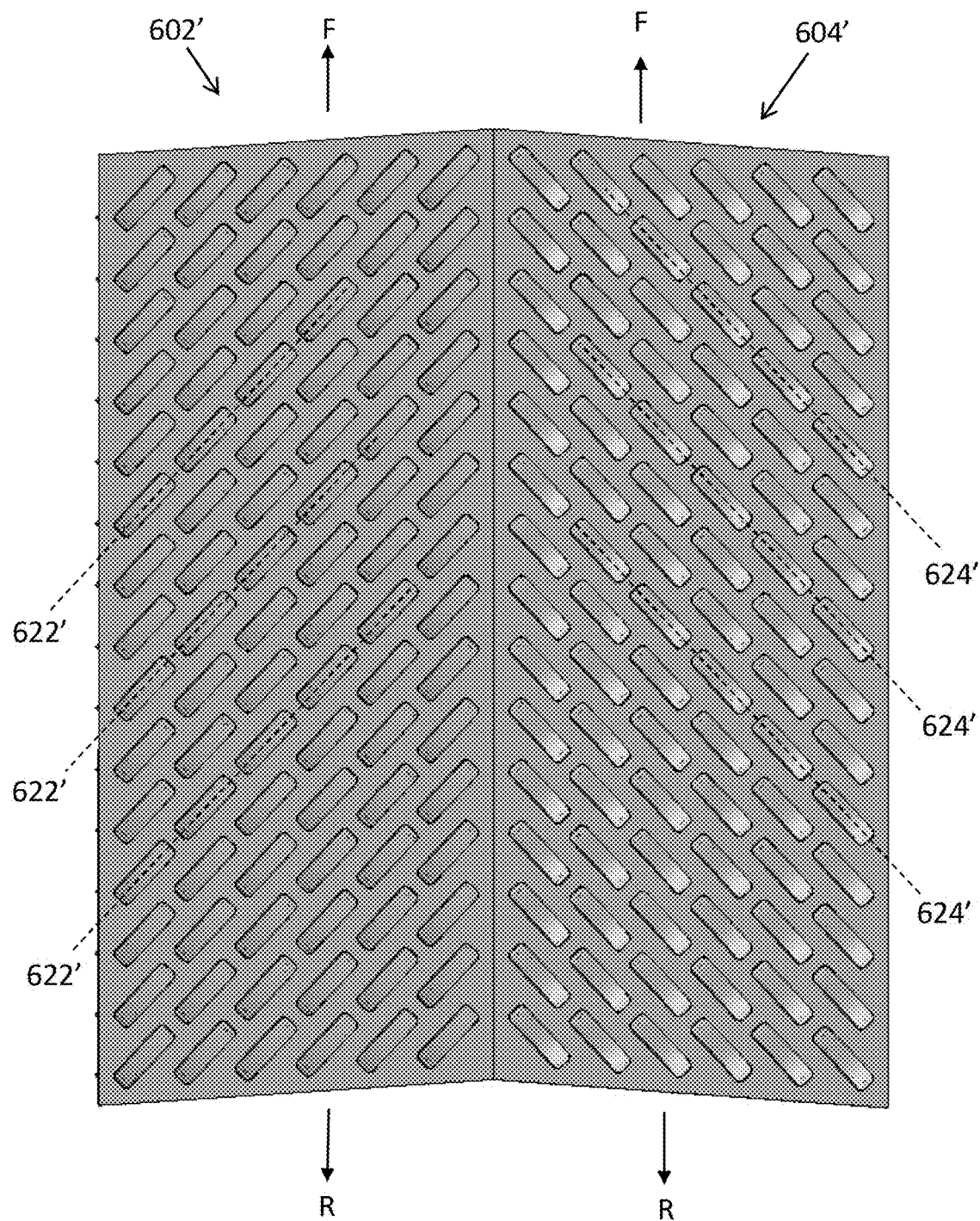
FIG. 6G is a top view of the members of FIG. 6E.

FIG. 6F illustrates an enlarged view of portions of members 602', 604' to more clearly illustrate the surface characteristics. Member 602' may include a surface 632' with a plurality of holes or openings 642' therethrough, while member 604' may similarly include a surface 634' with a plurality of holes or openings 644' therethrough. Referring briefly to FIG. 6G, the openings 642' of member 602' are aligned in a plurality of series 622', and the openings 644' of member 604' are aligned in a plurality of series 624' similar to the corresponding series in the embodiments of FIGS. 6A-D. Each opening 642' may include an individual protrusion 623' extending through the opening 642' and above the top surface 632'. Similarly, each opening 644' may include an individual protrusion 625' extending through the opening 644' and above the top surface 634'. Each protrusion 623', 625' may be similar in shape to protrusions 523, 525 described above in connection with FIGS. 5A-C. In other words, each protrusion 623', 625' may extend from a first end to a second end in a direction along the corresponding series 622', 624', with a top surface that is convex with a peak near the center between the first and second ends. However, it should be understood that each protrusion 623', 625' may take other shapes, for example similar to the protrusions shown in FIGS. 5D-F. Similar to protrusions 623, 625, each protrusion 623', 625' is preferably capable of being significantly depressed when a load is applied to the respective top surfaces, so that the protrusion is pushed partially or completely into or through the respective opening 642', 644'. Whereas protrusions 623, 625 are capable of being depressed in large part due to their shape and thickness, protrusions 623', 625' may derive this capability in large part from one or more springs or other biasing members 670'.

Figure 6H:
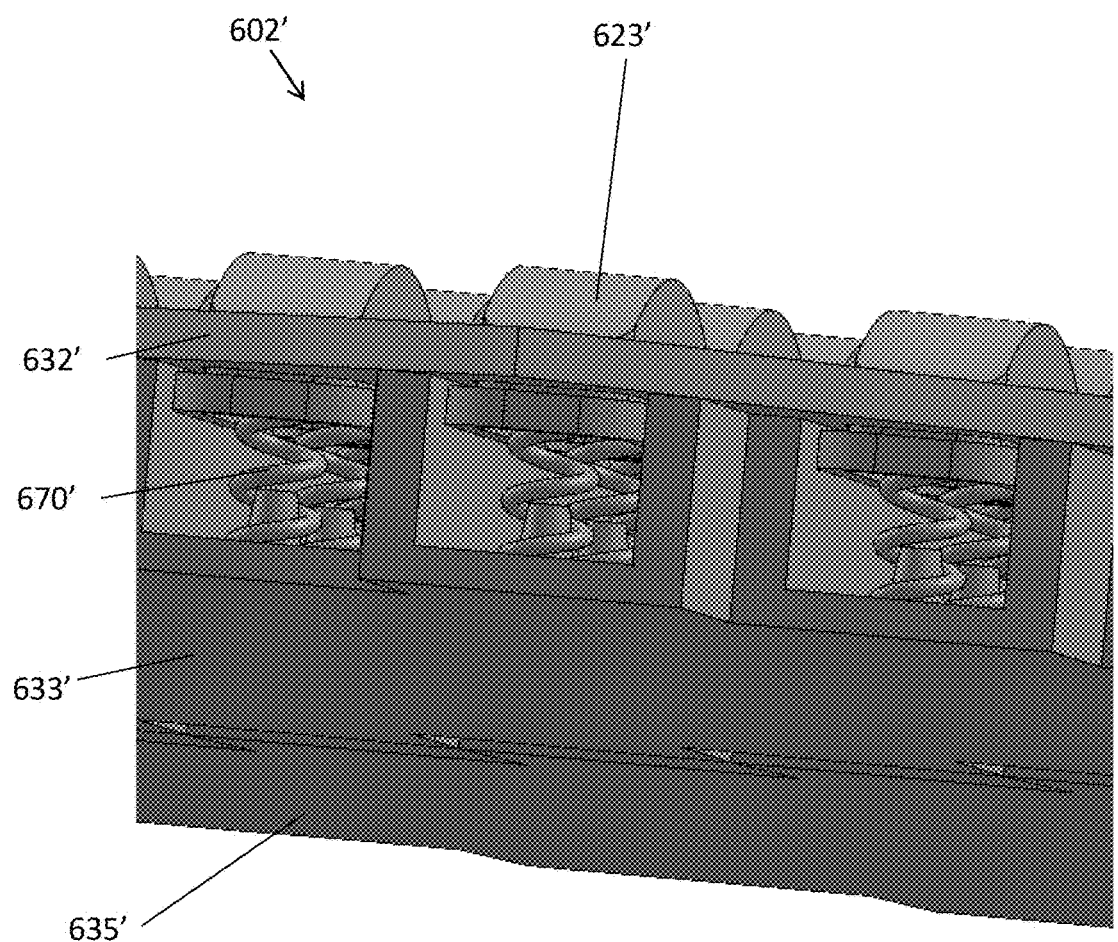
FIG. 6H is an enlarged side view of the members of FIG. 6E.

FIG. 6H illustrates a side view of a corner of member 602'. In one example, in addition to having top surface 632', member 602' may include a bottom surface 633'. Member 604' may similarly include a bottom surface 635' below top surface 634'. Each biasing member 670' may extend, contact, or otherwise engage, directly or indirectly, bottom surface 633' (or 635') and extend up to contact or otherwise engage, directly or indirectly, a bottom of a corresponding protrusion 623' (or 625'). The protrusions 623', 625' are each preferably biased so that, in the absence of an applied force, the protrusions 623', 625' protrude through their respective openings 642', 644' and present side surfaces that are substantially aligned with side surfaces of other protrusions 623', 625' in the same series 622', 624'. Although FIG. 6G shows that the series 622', 624' are each aligned at oblique angles with respect to the forward F and reverse R directions that are substantially equal one another, this does not need to be the case, as any oblique angle may be sufficient to provide omnidirectional movement of an object supported by members 602', 604'.

Although FIG. 6H illustrates a plurality of walls coupling the bottom surface 633' to the top surface 632', with a pair of walls flanking each protrusion 623' and extending along series 622', such side walls may not be necessary. In some cases, these side walls may help guide protrusions 623' as they are depressed and help resist canting. However, in other cases, these side walls may not be necessary and may be replaced with any suitable support that couples bottom surface 633' to top surface 632' to help the surfaces move in unison with one another.

Referring back to FIG. 6F, if an object is supported by a group of protrusions 623', 625', the object may depress each supporting protrusion 623', 625', with the protrusions not supporting the object remaining in the fully extended position. The flexibility of each protrusion 623', 625'—or the ability to be depressed—may depend on the material forming protrusions 623', 625', as well as the particular features of the biasing member(s) 670' (e.g. spring constant) and the number of biasing members 670' coupled to each protrusion 623', which may be one, two, or more. Similar to embodiments described above, if members 602', 604' both move in the forward direction simultaneously at the same speed, or in the reverse direction simultaneously at the same speed, the object supported by members 602', 604' will move in the corresponding direction. However, if there is relative movement between the members 602', 604', the object supported by the members will have a component of movement transverse the forward F and reverse R directions. Because the protrusions 623', 625' supporting the object will be depressed by the object, the remaining protrusions 623', 625' will be in the fully extended positions with the side surfaces of those protrusions available for contacting the object as it moves with respect to members 602', 604'. The side surfaces of protrusions 623', 625' in the fully extended position will provide a force component based in part on the angle of the protrusions and the speed (or relative speed) of members 602', 604'. The result is similar as described in the embodiments above, although, as with members 602, 604, the object may tend to be better "locked in" to a particular desired path of movement because of the large surface presented to the object.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:

1. A platform for providing omnidirectional movement comprising:
   a first moveable member having an exterior surface adapted to support an object and having a plurality of first surface features thereon, each first surface feature extending along at least a portion of a width of the exterior surface of the first moveable member;

a second moveable member having an exterior surface adapted to support the object and having a plurality of second surface features thereon, each second surface feature extending along at least a portion of a width of the exterior surface of the second moveable member; and a drive system operably coupled to the first and second moveable members and adapted to independently drive the first and second moveable members in a forward direction and a reverse direction;

wherein the plurality of first surface features and the plurality of second surface features are adapted to interact with the object to move the object in any direction along the exterior surfaces of the first and second moveable members when the drive system is driving at least one of the first and second moveable members;

wherein the first surface features are first grooves in the exterior surface of the first moveable member, and the second surface features are second grooves in the exterior surface of the second moveable member; and wherein the first moveable member is a group of first belts and the second moveable member is a group of second belts.

2. The platform of claim 1, wherein each first groove extends along an entire width of the exterior surface of a respective belt in the group of first belts, and each second groove extends along an entire width of the exterior surface of a respective belt in the group of second belts.

3. The platform of claim 1, wherein a line extending along each first groove of a first belt in the first group of belts is aligned with a corresponding first groove of a second belt in the first group of belts.

4. The platform of claim 1, wherein the first grooves include first side surfaces configured to contact the object, and the second grooves include second side surfaces configured to contact the object.

5. The platform of claim 4, wherein each belt in the group of first belts includes a plurality of first protruding members defining the first side surfaces of the first grooves, and each belt in the group of second belts includes a plurality of second protruding members defining the second side surfaces.

6. The platform of claim 1, wherein the drive system includes:
a first drive member extending along a first longitudinal axis and configured to rotate about the first longitudinal axis; and
a second drive member extending along a second longitudinal axis and configured to rotate about the second longitudinal axis, the first longitudinal axis being substantially parallel to the second longitudinal axis.

7. A system for providing omnidirectional movement comprising:
the platform of claim 1; and
the object,
wherein the object includes a plurality of protrusions extending from a surface of the object, each protrusion adapted to contact the first grooves and the second grooves.

8. A platform for providing omnidirectional movement comprising:
a first moveable member including first and second substantially rigid members, each rigid member having an exterior surface adapted to support an object;
a second moveable member including third and fourth substantially rigid members, each rigid member having an exterior surface adapted to support the object;
a first drive system operably coupled to the first moveable member and adapted to drive the first and second rigid members along a first path of motion in a forward or reverse direction simultaneously but in an out-of-phase fashion;
a second drive system operably coupled to the second moveable member and adapted to drive the third and fourth rigid members along a second path of motion in the forward or reverse direction simultaneously but in an out-of-phase fashion;
wherein the exterior surfaces of the first, second, third, and fourth rigid members are adapted to interact with the object to move the object in any direction along the exterior surfaces while at least one of the first and second drive systems are moving corresponding rigid members along a corresponding path of motion.

9. The platform of claim 8, wherein the first, second, third, and fourth rigid members are planks.

10. The platform of claim 8, wherein the first and second paths of motion each include a substantially straight component extending from a first end to a second end, and a return component extending from the first end to the second end.

11. The platform of claim 10, wherein the return components of the first and second paths of motion are substantially curved.

12. The platform of claim 10, wherein the first drive system is adapted to position at least one of the exterior surfaces of the first and second rigid members along the substantially straight component of the first path of motion at all times.

13. The platform of claim 12, wherein the second drive system is adapted to position at least one of the exterior surfaces of the third and fourth rigid members along the substantially straight component of the second path of motion at all times.

14. A system for providing omnidirectional movement comprising:
an object;
a first moveable member having an exterior surface adapted to support the object and having a plurality of first surface features thereon, each first surface feature extending along at least a portion of a width of the exterior surface of the first moveable member;
a second moveable member having an exterior surface adapted to support the object and having a plurality of second surface features thereon, each second surface feature extending along at least a portion of a width of the exterior surface of the second moveable member; and
a drive system operably coupled to the first and second moveable members and adapted to independently drive the first and second moveable members in a forward direction and a reverse direction;
wherein the plurality of first surface features and the plurality of second surface features are adapted to interact with the object to move the object in any direction along the exterior surfaces of the first and second moveable members when the drive system is driving at least one of the first and second moveable members; and
wherein the object includes a plurality of protrusions extending from a surface of the object, each protrusion adapted to contact the plurality of first surface features and the plurality of second surface features.

15. The system of claim 14, wherein the first surface features are first grooves in the exterior surface of the first moveable member, and the second surface features are second grooves in the exterior surface of the second moveable member.

16. The system of claim 15, wherein each first groove extends along an entire width of the exterior surface of the first moveable member, and each second groove extends along an entire width of the exterior surface of the second moveable member.

17. The system of claim 15, wherein the first moveable member is a group of first belts, and a line extending along each first groove of one belt in the group of first belts is aligned with a corresponding first groove of another belt in the group of first belts.

18. The system of claim 14, wherein the first surface features are first side surfaces configured to contact the object, and the second surface features are second side surfaces configured to contact the object.

19. The system of claim 18, wherein the first moveable member includes a plurality of first protruding members defining the first side surfaces, and the second moveable member includes a plurality of second protruding members defining the second side surfaces.

20. The system of claim 14, wherein the first moveable member is a first belt and the second moveable member is a second belt.

21. The system of claim 14, wherein the drive system includes:
- a first drive member extending along a first longitudinal axis and configured to rotate about the first longitudinal axis; and
- a second drive member extending along a second longitudinal axis and configured to rotate about the second longitudinal axis, the first longitudinal axis being substantially parallel to the second longitudinal axis.

* * * * *